United States Patent
Xu et al.

(10) Patent No.: US 12,449,854 B2
(45) Date of Patent: Oct. 21, 2025

(54) FLEXIBLE DISPLAY PANEL AND DISPLAY APPARATUS

(71) Applicant: KunShan Go-Visionox Opto-Electronics Co., Ltd, Jiangsu (CN)

(72) Inventors: Gusheng Xu, Kunshan (CN); Desong Yan, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 659 days.

(21) Appl. No.: 17/863,694

(22) Filed: Jul. 13, 2022

(65) Prior Publication Data

US 2022/0350369 A1 Nov. 3, 2022

Related U.S. Application Data

(63) Continuation of application No. PCT/CN2020/140388, filed on Dec. 28, 2020.

(51) Int. Cl.
G06F 1/16 (2006.01)
G06F 1/20 (2006.01)

(52) U.S. Cl.
CPC .......... *G06F 1/1652* (2013.01); *G06F 1/1624* (2013.01); *G06F 1/203* (2013.01)

(58) Field of Classification Search
None
See application file for complete search history.

(56) References Cited

U.S. PATENT DOCUMENTS

| 2017/0064879 A1* | 3/2017 | Lee | G06F 1/16 |
| 2017/0212556 A1* | 7/2017 | Jovanovic | G06F 1/1652 |
| 2019/0250668 A1* | 8/2019 | Kim | H10K 77/111 |

FOREIGN PATENT DOCUMENTS

| CN | 105094291 A | 11/2015 |
| CN | 105788460 A | 7/2016 |
| CN | 106663392 A | 5/2017 |

(Continued)

OTHER PUBLICATIONS

Office Action issued on Feb. 24, 2023, in corresponding Chinese Application No. 202080074947.0, 9 pages including partial English translation.

(Continued)

*Primary Examiner* — Anthony J Frost
(74) *Attorney, Agent, or Firm* — Maier & Maier, PLLC

(57) ABSTRACT

One or more embodiments of the present application relate to a flexible display panel and a display apparatus, the flexible display panel includes a display layer, an upper layer group located above the display layer, and a lower layer group located below the display layer. The upper layer group includes at least one layer. The lower layer group includes at least one layer. The at least one layer of the upper layer group and/or the at least one layer of the lower layer group comprises at least one target layer. In response to a trigger condition, a characteristic parameter of at least partial region of the at least one target layer in the upper layer group and/or the lower layer group switches between a first range and a second range, and a minimum value in the second range is greater than a maximum value in the first range.

9 Claims, 10 Drawing Sheets

(56) References Cited

FOREIGN PATENT DOCUMENTS

| CN | 111831059 A | 10/2020 |
|----|-------------|---------|
| WO | 2020096153 A1 | 5/2020 |

OTHER PUBLICATIONS

International Search Report issued on Sep. 29, 2021 in corresponding International Patent Application No. PCT/CN2020/140388;12 pages.

* cited by examiner

FLEXIBLE DISPLAY PANEL AND DISPLAY APPARATUS

CROSS REFERENCES TO RELATED APPLICATIONS

The present application is a continuation of International Application No. PCT/CN2020/140388, filed on Dec. 28, 2020 and titled "FLEXIBLE DISPLAY PANEL AND DISPLAY APPARATUS", content of which is incorporated here by reference in its entirety.

TECHNICAL FIELD

The present application relates to the technical field of display panels, and particularly relates to a flexible display panel and a display apparatus.

BACKGROUND

With the development of display technology, a flexible display panel has gradually entered the market. The flexible display panel can be unfolded when it is required to display and can be folded by winding when it is not required to display. The current flexible display panel, in order to ensure the flatness when unfolded, needs to include a support layer with relatively high hardness, while such support layer will lead to poor bending performance of the flexible display panel, resulting in that the flexible display panel may break after many times of bending.

Therefore, it is necessary to provide a flexible display panel which can solve the above problems.

SUMMARY

One of the embodiments of the present disclosure provides a flexible display panel, including a display layer, an upper layer group located above the display layer, and a lower layer group located below the display layer, wherein the upper layer group comprises at least one layer; the lower layer group comprises at least one layer; the at least one layer of the upper layer group and/or the at least one layer of the lower layer group comprises at least one target layer; in response to a trigger condition, a characteristic parameter of at least partial region of the at least one target layer in the upper layer group and/or the lower layer group switches between a first range and a second range, and a minimum value in the second range is greater than a maximum value in the first range.

In some embodiments, the characteristic parameter includes at least one of hardness, stiffness and elastic modulus of the at least partial region.

In some embodiments, the trigger condition includes a condition that a force applied to the at least partial region is greater than a first threshold or less than a second threshold, wherein the second threshold is less than the first threshold.

In some embodiments, in response to the trigger condition, the characteristic parameter of the at least partial region of the at least one target layer in the upper layer group and/or the lower layer group switches between the first range and the second range includes: in response to a condition that the force applied to the at least partial region is greater than the first threshold, the characteristic parameter switches from the second range to the first range; or in response to a condition that the force applied to the at least partial region is less than the second threshold, the characteristic parameter switches from the first range to the second range.

In some embodiments, the at least one target layer includes a smart material, and the characteristic parameter of the smart material changes when subjected to force.

In some embodiments, the at least one target layer includes a pseudoplastic fluid material.

In some embodiments, wherein the upper layer group includes a cover plate layer, and the at least one target layer is located above the cover plate layer.

In some embodiments, wherein the lower layer group includes a support layer, and the at least one target layer is located below the support layer.

In some embodiments, wherein the force applied to the at least partial region includes a pressure applied to the at least partial region of the at least one target layer when the at least partial region is bent.

In some embodiments, the trigger condition includes a condition that a temperature of the at least partial region is higher than a third threshold or lower than a fourth threshold, wherein the fourth threshold is less than the third threshold.

In some embodiments, in response to the trigger condition, the characteristic parameter of the at least partial region of the at least one target layer in the upper layer group and/or the lower layer group switches between the first range and the second range includes: in response to a condition that the temperature of the at least partial region is higher than the third threshold, the characteristic parameter switches from the second range to the first range; or in response to a condition that the temperature of the at least partial region is lower than the fourth threshold, the characteristic parameter switches from the first range to the second range.

In some embodiments, the third threshold is in a range from 25 degrees Celsius to 45 degrees Celsius; the fourth threshold is lower than 25 degrees Celsius.

In some embodiments, the flexible display panel further includes a temperature adjustment device, and the trigger condition is provided by the temperature adjustment device.

In some embodiments, the temperature adjustment device includes a heating element for heating the at least partial region of the at least one target layer.

In some embodiments, the flexible display panel can be bent along an axis during a sliding process, and the heating element is disposed in a target region on one side of the axis, the heating element is configured for heating the at least partial region of the at least one target layer that has reached the target region.

In some embodiments, the flexible display panel further includes one or more sensors and a controller. At least one of the one or more sensors is configured to detect whether the flexible display panel slides. The controller is configured to: in response to a condition that the flexible display panel slides which is detected by the sensor, turn on the heating element; or in response to a condition that the flexible display panel stops sliding which is detected by the sensor, turn off the heating element.

In some embodiments, the temperature adjustment device further includes at least one of a first heat shielding element and a second heat shielding element. The first heat shielding element is disposed on a side of the target region, and the first heat shielding element is configured to prevent heat of the target region from conducting to a part of the flexible display panel that has not slid to the target region during the sliding process of the flexible display panel. The second heat shielding element is located between the heating element and the lower layer group, and the second heat shielding element is configured to prevent the heat of the target region from conducting to a part of the flexible display panel that has slid to the target region when the flexible display panel stops sliding.

In some embodiments, the flexible display panel is physically connected with a rotating shaft, the flexible display panel can be bent along the rotating shaft during sliding. The heating element is thermally connected with the rotating shaft, the heating element is configured for heating the rotating shaft.

In some embodiments, the rotating shaft includes an extension region. When the heating element heats the rotating shaft, the extension region is configured to preheat the at least partial region of the at least one target layer that has slid to the extension region.

In some embodiments, the flexible display panel is connected with a terminal device. The terminal device includes a heating element thermally connected with the at least partial region of the at least one target layer.

BRIEF DESCRIPTION OF THE DRAWINGS

The present application will be further described by way of exemplary embodiments, which will be described in detail by means of the accompanying drawings. These embodiments are not limiting, and in these embodiments, the same numbers refer to the same structures, wherein.

DETAILED DESCRIPTION

Figure 1:
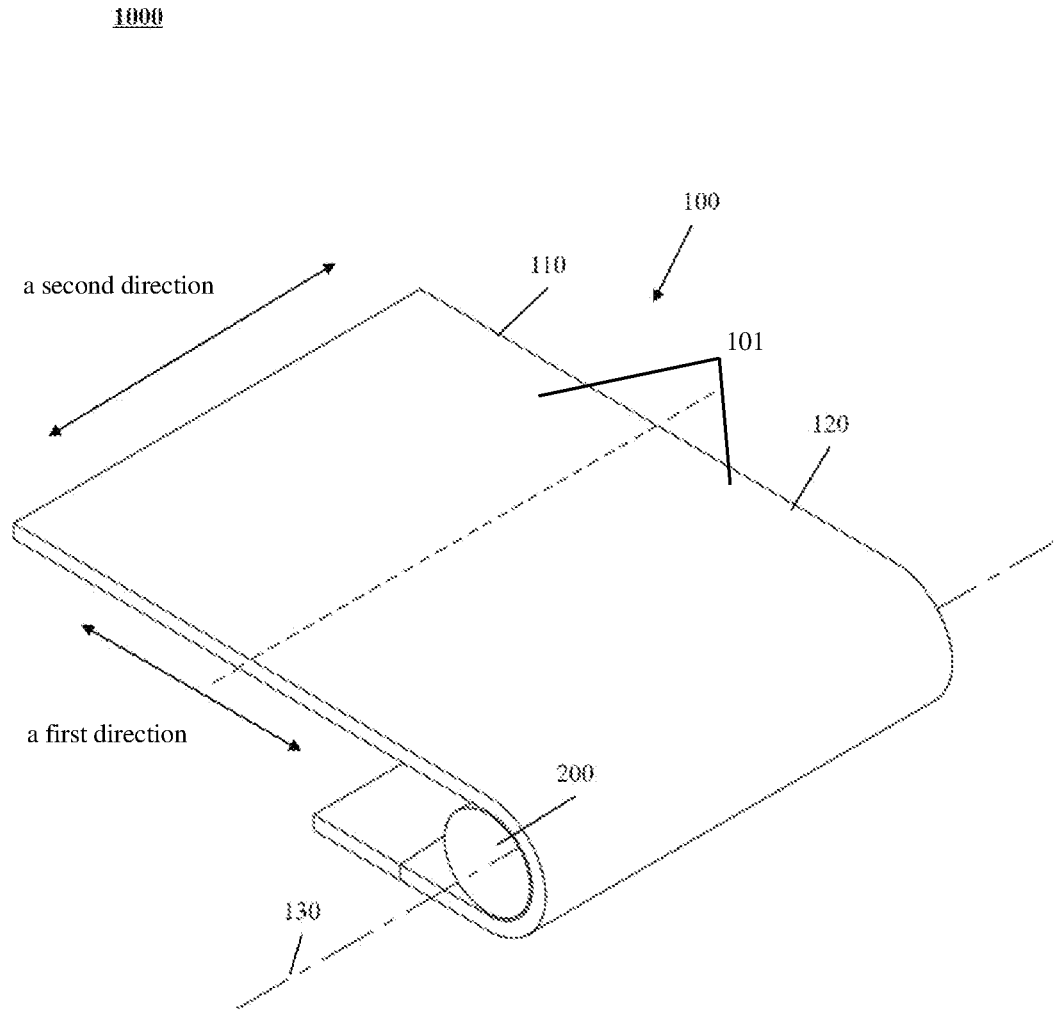
FIG. 1 is a partial structural schematic diagram of a flexible display apparatus according to some embodiments of the present application.

Exemplary embodiments or implementations will be described in detail herein, examples of which are illustrated in the accompanying drawings. Where the following description refers to the accompanying drawings, the same numerals in different drawings refer to the same or similar elements unless otherwise indicated. The implementations described in the exemplary embodiments below are not intended to represent all implementations consistent with the present application. Rather, they are merely examples of apparatus and methods consistent with some aspects of the present application as recited in the appended claims.

The terms used in the present application are merely for the purpose of describing particular embodiments and are not intended to limit the present application. As used in the present application and the appended claims, the singular forms "a," "the" and "said" are intended to include the plural forms as well, unless the context clearly dictates otherwise.

It should be understood that "first", "second" and similar words used in the description and claims of the present application do not indicate any order, quantity or importance, but are only used to distinguish different components. Likewise, "a" or "an" and the like do not denote a quantitative limitation, but rather denote the presence of at least one. Unless otherwise indicated, terms such as "front," "rear," "lower," and/or "upper" are for convenience of description and are not limited to one location or one spatial orientation. Words like "include" or "comprise" mean that the element or item appearing before them covers the elements or items listed after them and their equivalents, and do not exclude other elements or items.

The flexible display panel according to one or more embodiments of the present application may be applied to display apparatuses of different electronic products. The different electronic products may include, but are not limited to, various terminal devices such as mobile phones, personal computers, keyboards, monitors, televisions, vehicle display terminals, and e-books.

The flexible display panel according to some embodiments of the present application includes a display region that can display content (e.g., images) for viewing by a user. The flexible display panel includes a non-bending portion and a bending portion, and the display region is located on the non-bending portion and the bending portion. When the bending portion of the flexible display panel is bent or curved with its shape changed, an area of the display region that can be observed by the user changes accordingly. In some embodiments, the flexible display panel can be used as a display screen of a sliding screen mobile phone, and the bending portion of the flexible display panel is stored on a back of the display region or directly wound on a rotating shaft after being bent through the rotating shaft; the user can choose, according to their own needs, to store the bending portion of the flexible display panel on the back of the display region or directly wind it on the rotating shaft to reduce the exposed area of the display region of the flexible display panel, so as to make the flexible display panel more portable; the user also can choose to pull out the bending portion of the flexible display panel from the back of the display region to increase the exposed area of the display region of the flexible display panel, so as to display more content.

In some embodiments, as shown in FIG. 1, the flexible display panel 100 may include a non-bending portion 110 and a bending portion 120, a display region 101 is located on a front of the non-bending portion 110 and of the bending portion 120, and the bending portion 120 can be stored on a back of the non-bending portion 110 after being bent around a predetermined axis 130, wherein a surface of the flexible display panel 100 used for display can be understood as the front, and a surface opposite to the front can be understood as the back. In some embodiments, part or all of the bending portion 120 can be bent around the predetermined axis 130. In some embodiments, the bending portion 120 can be bent around the predetermined axis 130 with a bending angle greater than 120°. In some embodiments, the bending portion 120 can be bent around the predetermined axis 130 with a bending angle greater than 150°. In some embodiments, the bending portion 120 can be bent around the predetermined axis 130 with a bending angle greater than 170°. In some embodiments, the bending portion 120 can be bent around the predetermined axis 130 with a bending angle of approximately 180° (in a range of −5°-+5°). In some embodiments, the bending portion 120 can be bent around the predetermined axis 130 with a bending angle much larger than 180°, that is, it can be wound on a rotating shaft 200, and for example, when the bending portion 120 is wound on the rotating shaft 200 for one turn, two turns, three turns, . . . , the bending angle of the bending portion 120 around the predetermined axis 130 is 360°, 720°, 1080°, . . . , wherein the predetermined axis 130 in the present embodiment is an axis of a rotating shaft 200. The bending angle of the bending portion 120 around the predetermined axis refers to the angle that the front of the bent part of the bending portion 120 changes relative to the front of the non-bending portion 110 after part or all of the bending portion 120 has been bent around the predetermined axis 130.

In some embodiments, both of the non-bending portion 110 and the bending portion 120 may be used to display images. In some embodiments, in order to allow the bending portion 120 of the flexible display panel 100 to be bent in a first direction, and also allow the flexible display panel 100 to have sufficient stiffness when fully unfolded so that a display surface of the bending portion 120 can be maintained flat when the bending portion 120 displays images without affecting the display effect of the flexible display panel, the flexible display panel has different stiffness requirements in different directions.

In some embodiments, the bending portion 120 has a stiffness in a first direction lower than its stiffness in a second direction. As shown in FIG. 1, the first direction in the present application refers to a direction in which the flexible display panel is perpendicular or substantially perpendicular to the predetermined axis 130; a direction in which the flexible display panel is parallel or substantially parallel to the predetermined axis is the second direction. In some embodiments, the first direction may be a winding direction or a sliding direction of the flexible display panel 100. In some embodiments, the winding direction of the flexible display panel refers to a direction in which one end of the flexible display panel 100 that begins to be wound, moves relative to the other end. In some embodiments, the sliding direction of the flexible display panel is a direction in which one end of the flexible display panel moves when the flexible display panel is unfolded or folded. Substantially perpendicular or substantially parallel in the present application means that a small amount of error may be allowed with respect to the perpendicular or parallel direction, and the error may be in a range of −5°-+5°. In some embodiments, the error may be between ±4°. In some embodiments, the error may be between −3° and +3°. In some embodiments, the error may be between −1° and +1°. For example, an angle between the first direction and a vertical line of the predetermined axis 130 may be in a range of 0-5°, and an angle between the second direction and a parallel line of the predetermined axis 130 may be in a range of 0-5°.

In some embodiments, the bending portion 120 has a stiffness between 0.01 GPa and 100 GPa in the first direction; in some embodiments, the bending portion 120 has a stiffness between 0.01 GPa and 50 GPa in the first direction; In some embodiments, the bending portion 120 has a stiffness between 0.01 GPa and 20 GPa in the first direction; in some embodiments, the bending portion 120 has a stiffness between 0.01 GPa and 10 GPa in the first direction; in some embodiments, the bending portion 120 has a stiffness between 0.01 GPa and 5 GPa in the first direction; in some embodiments, the bending portion 120 has a stiffness between 0.01 GPa and 1 GPa in the first direction; in some embodiments, the bending portion 120 has a stiffness between 10 GPa and 1000 GPa in the second direction; in some embodiments, the bending portion 120 has a stiffness between 10 GPa and 800 GPa in the second direction; in some embodiments, the bending portion 120 has a stiffness between 10 GPa and 500 GPa in the second direction; in some embodiments, the bending portion 120 has a stiffness between 10 GPa and 300 GPa in the second direction.

In some embodiments, the flexible display panel 100 may be applied to a display apparatus. In some embodiments, the display apparatus may include a flexible display panel 100 and a rotating shaft 200. In some embodiments, the display apparatus may include a display screen with a variable area. In some embodiments, the display region of the flexible display panel 100 presented in the user's field of view may serve as a display screen of the display apparatus. In some embodiments, part or all of the bending portion 120 of the flexible display panel 100 can be stored in a storage region of the display apparatus (for example, the back of the non-bending portion 110) or wound on the rotating shaft 200 after being bent around the rotating shaft 200, wherein the part of the bending portion 120 wound on the rotating shaft 200 and located at the storage region is invisible to the user, and the part located outside the storage region or not wound on the rotating shaft 200 is visible to the user. In some embodiments, the display region on the non-bending portion 110 and on the part of the bending portion 120 visible to the user may serve as the display screen of the display apparatus. In some embodiments, the bending portion 120 of the flexible display panel 100 can be pulled out from the storage region (for example, the back of the non-bending portion 110) by a sliding movement in the first direction and through the rotating shaft 200, and can be optionally presented in the user's field of vision as an extended display region, becoming a part of the display screen of the display apparatus, and thereby increasing the area of the display screen of the display apparatus. In some embodiments, the bending portion 120 can also be wound into the back of the non-bending portion 110 through the rotating shaft 200 for storage, so as to decrease the area of the display screen of the display apparatus 1000. In some embodiments, when the bending portion 120 is bent and stored on the back of the flexible display panel 100 or is wound on the rotating shaft 200, the display region on this portion will not be observed by the user, and may be set into a screen-off state; when at least a part of the bending portion 120 around the rotating shaft 200 is pulled out to the front of the flexible display panel 100, the part of the display region that returns to the front can be turned into a screen-on state and display contents, thereby increasing the area of the display region that is visible to the user.

Figure 2:
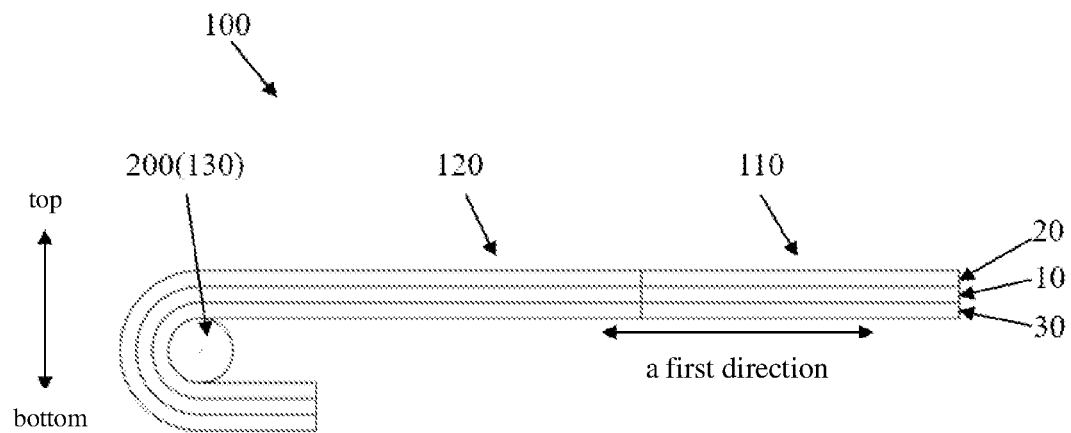
FIG. 2 is a schematic structural diagram of a flexible display apparatus according to some embodiments of the present application.

In some embodiments, as shown in FIG. 2, the flexible display panel 100 may include a display layer 10 and a layer group. In some embodiments, the layer group may include an upper layer group 20 and a lower layer group 30, wherein the upper layer group 20 is located above the display layer 10 and the lower layer group 30 is located below the display layer 10. In some embodiments, the layer group may include merely the lower layer group 30 located below the display layer 10. The upper and lower in the present application refer to the directions of the front and back relative to the display surface of the non-bending portion 110 of the flexible display panel 100, the direction of the front of the display surface of the flexible display panel 100 is upper, and the direction of the back of the display surface of the flexible display panel 100 is lower.

In some embodiments, the display layer 10 may correspond to the display region (including the non-bending portion 110 and the bending portion 120) of the flexible display panel for displaying images. In some embodiments, the display layer 10 may include a layer for emitting lights. In some embodiments, the device for emitting lights in the display layer 10 may include, but is not limited to: Organic Light Emitting Diode (OLED), Light Emitting Diode (LED), Micro Light Emitting Diode (Micro LED), Mini Light Emitting Diode (Mini LED), and so on.

In some embodiments, the display layer 10 may include at least two layers. In some embodiments, the display layer 10 may include a display device layer 11 and a display driving layer 12, wherein the display driving layer 12 may be located below the display device layer 11. In some embodiments, the display device layer 11 may include an Organic Light Emitting Diode (OLED) light-emitting layer, the OLED light-emitting layer includes a plurality of pixel units arranged in an array, and the pixel units emit lights so that the display device layer can display images.

In some embodiments, the display driving layer 12 may be used to provide display-related control devices for the display device layer 11. In some embodiments, the display driving layer 12 may include a pixel driving circuit, and the pixel driving circuit is electrically connected to the display device layer 11 for controlling the image display of the display device layer 11. In some embodiments, the pixel driving circuit may include, but is not limited to, a TFT (Thin Film Transistor) device, a capacitor device, and so on.

Figure 3:
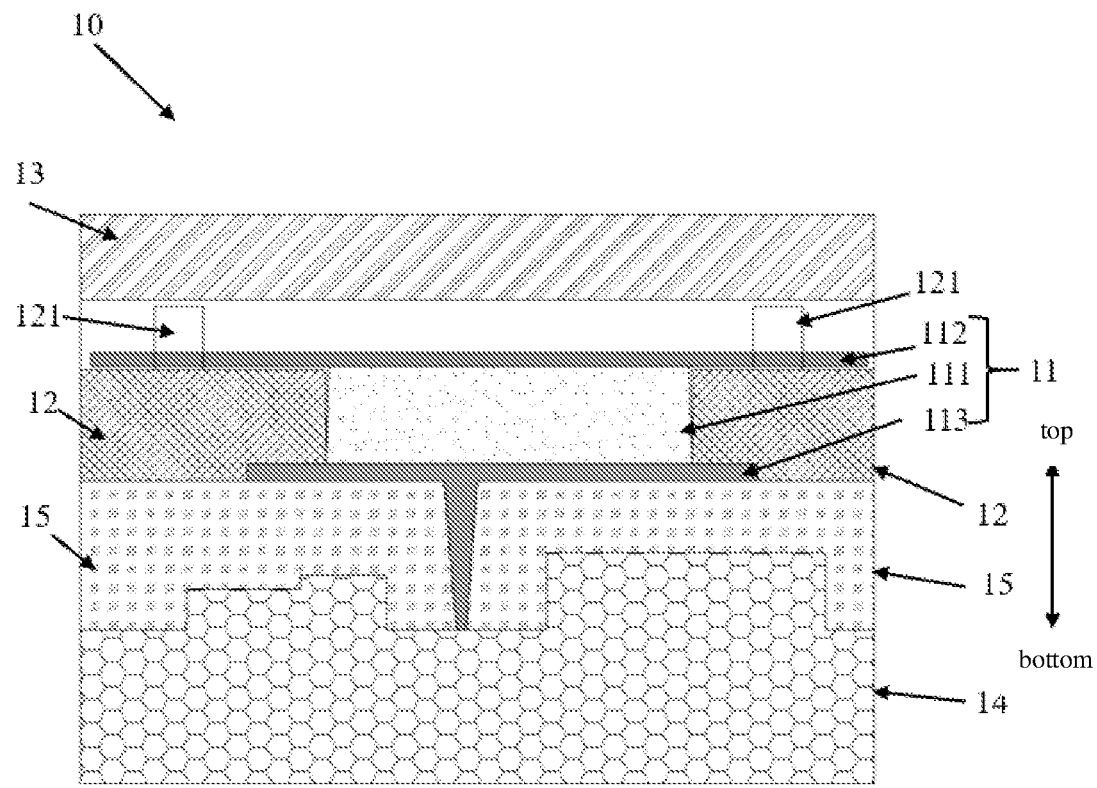
FIG. 3 is a schematic structural diagram of a flexible display layer according to some embodiments of the present application.

In some embodiments, as shown in FIG. 3, the display layer 10 may further include an encapsulation layer 13, and the encapsulation layer 13 may be located above the display device layer 11. In some embodiments, since the OLED light-emitting layer in the display device layer 11 includes organic materials, the organic materials are sensitive to oxygen and water vapor and may be eroded by oxygen and water vapor and eventually fail, thereby reducing a service life of the OLED light-emitting layer. In order to improve the service life of the OLED light-emitting layer, the display device layer may be encapsulated by passivation layer encapsulation technology, Atomic Layer Deposition (ALD) technology, Barix encapsulation technology, Glass Frit (FRIT) encapsulation technology, Thin-Film Encapsulation (TFE) technology, and so on, to form the encapsulation layer 13 on the display device layer 11, and the encapsulation layer 13 can block oxygen and water vapor from entering the display device layer 11, thereby avoiding the organic materials in the OLED light-emitting layer from being eroded. In some embodiments, the encapsulation layer 13 may be a thin film structure. In some embodiments, the material of the encapsulation layer 13 may include, but is not limited to, silicon nitride, polyethylene, polyacrylate, ceramic, glass frit, and so on.

In some embodiments, as shown in FIG. 3, the display layer 10 may further include a planarization layer 14, and the planarization layer 14 may be located between the display device layer 11 and the display driving layer 12. In some embodiments, since the display driving layer 12 includes a pixel driving circuit, and in order to achieve electrical connection with the display device layer 11, the display driving layer 12 includes various wirings and via holes, resulting in fluctuations on an upper surface of the display driving layer 12, and if the display device layer 11 is directly disposed on the display driving layer 12, a display surface of the display device layer 11 (i.e., a surface facing the front of the flexible display panel 100) will be uneven, affecting the display effect of the display device layer 11. Therefore, the planarization layer 14 can be disposed between the display device layer 11 and the display driving layer 12, and a lower surface of the planarization layer 14 can be fitted with the upper surface of the display driving layer 12 (that is, a shape of the lower surface of the planarization layer 14 may match a shape of the upper surface of the display driving layer 12), while an upper surface of the planarization layer 14 may be a relatively flat plane; and when the display device layer 11 is disposed on the upper surface of the planarization layer 14, the display device layer 11 may be made to have a flat display surface, thereby ensuring its display effect. In some embodiments, the planarization layer 14 may further be provided with through holes penetrating through the planarization layer from top to bottom, so as to facilitate the electrical connection between the display driving layer 12 and the display device layer 11. In some embodiments, the planarization layer 14 may include, but is not limited to, electrical insulator materials such as silicon dioxide and silicon nitride, organic polymers (for example, acrylic, melamine-based or urethane-based polymers), or organic-inorganic hybrid composite materials, or the like.

In some embodiments, the display layer 10 may be a multi-layer structure, and in order to securely connect the layers of the display layer 10 together, an adhesive layer (not shown in the figure) may be provided between adjacent two layers of the display layer 10, which can reliably bond adjacent two layers in the display layer 10 together. In some embodiments, the adhesive layer in the display layer 10 may be an optical adhesive with strong adhesiveness. In some embodiments, the adhesive layer in the display layer 10 may be Optically Clear Adhesive (OCA). In some embodiments, the adhesive layer in the display layer 10 may be an Ultraviolet Rays adhesive (UV adhesive). In some embodiments, the adhesive layer in the display layer 10 may be made of the same material as an adhesive layer 24 in the upper layer group 20 or an adhesive layer 34 in the lower layer group 30. In some embodiments, the adhesive layer in the display layer 10 may be made of different materials from the adhesive layer 24 in the upper layer group 20 or the adhesive layer 34 in the lower layer group 30, to meet different bonding strength requirements respectively corresponding to the display layer 10, the upper layer group 20 and the lower layer group 30. For the description of the adhesive layer 24 and the adhesive layer 34, please refer to FIG. 4 and FIG. 5 and their related descriptions, respectively.

Figure 4:
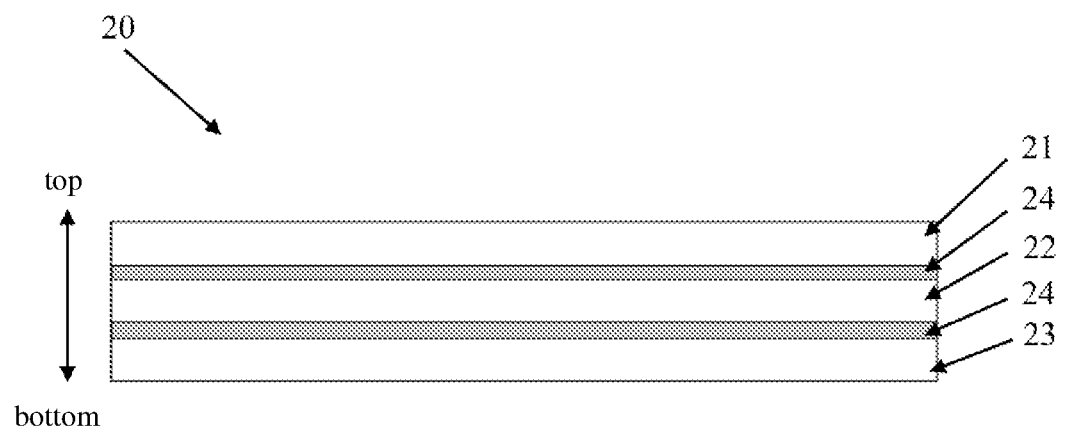
FIG. 4 is a schematic structural diagram of layers above a flexible display layer according to some embodiments of the present application.

In some embodiments, the upper layer group 20 may be configured to protect the display layer 10, and for example, the upper layer group 20 may protect the display layer 10 from being damaged by impacts. In some embodiments, as shown in FIG. 4, the upper layer group 20 may include a cover plate layer 21, and the cover plate layer 21 may protect the display layer 10. In some embodiments, the cover plate layer 21 may be glass (for example, Ultra Thin Glass (UTG)). In some embodiments, the cover plate layer 21 may be Polymethyl Methacrylate (PMMA). In some embodiments, the cover plate layer 21 may be a clear polyimide film (CPI).

In some embodiments, the upper layer group 20 may further provide a touch function for the flexible display panel. In some embodiments, the user of the flexible display panel can operate the images displayed by the flexible display panel on the upper layer group by touching. As shown in FIG. 4, the upper layer group 20 may further include a touch layer 22. The touch layer is disposed below the cover plate layer 21 for sensing the user's touch action on the cover plate layer 21. In some embodiments, the touch layer 22 may be a Polyethylene Terephthalate (PET) film, an Indium Tin Oxide (ITO) film, or the like. In some embodiments, the touch layer 22 may include touch sensors for detecting touch actions. In some embodiments, touch sensors may include, but are not limited to, infrared sensors, resistive sensors, surface acoustic wave sensors, capacitive sensors, and so on. In some embodiments, the cover plate layer 21 can protect the touch layer 22 to prevent the touch layer 22 from being damaged by impacts. In some embodiments, the touch layer 22 can be directly embedded in the display layer 10 to reduce the thickness of the flexible display panel 100 while realizing the touch function.

In some embodiments, the upper layer group 20 can further absorb reflected lights from metal electrodes (for example, metal electrodes in the touch layer, metal electrodes in the display device layer 11) in the flexible display panel to external lights, thereby reducing the interference of the external lights, increasing the contrast of the displayed image, and thus the user of the flexible apparatus can clearly see the displayed images. In some embodiments, the upper layer group 20 may further include an optical layer 23. In some embodiments, the optical layer 23 may include a circular polarizer or a linear polarizer for absorbing or refracting the reflected lights, so as to reduce the interference of the reflected lights to the image display of the display device layer 11. In some embodiments, the material of the polarizer may include, but is not limited to, Triacetyl Cellulose (TAC), Polyethylene Terephthalate (PET), Cyclo Olefin Polymer (COP), Polymethyl Methacrylate (PMMA), and so on. In some embodiments, the optical layer may be located between the touch layer 22 and the display layer 10.

In some embodiments, the upper layer group 20 may include at least one layer. In some embodiments, the upper layer group may include merely a cover plate layer 21. In some embodiments, the upper layer group 20 may include a cover plate layer and an optical layer. In some embodiments, the upper layer group 20 may include all of a cover plate layer 21, a touch layer 22 and an optical layer 23. In some embodiments, as shown in FIG. 4, in order to securely connect adjacent two layers in the upper layer group 20, the upper layer group 20 may further include an adhesive layer 24 disposed between adjacent two layers in the upper layer group 20, the cover plate layer 21 and the touch layer 22, and the touch layer 22 and the optical layer 23 can be reliably bonded together by the adhesive layer 24. In some embodiments, the adhesive layer 24 may be an optical adhesive with strong adhesiveness. In some embodiments, the adhesive layer 24 may be Optically Clear Adhesive (OCA). In some embodiments, the adhesive layer 24 may be Ultraviolet Rays adhesive (UV adhesive).

Figure 5:
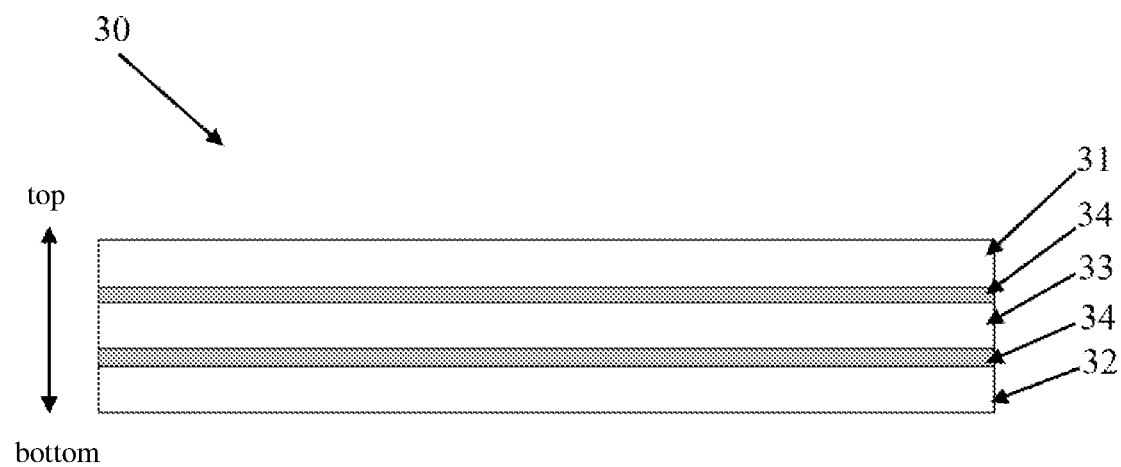
FIG. 5 is a schematic structural diagram of layers below the flexible display layer according to some embodiments of the present application.

In some embodiments, the lower layer group 30 may be configured to support the upper layer group 20 and the display layer 10. In some embodiments, as shown in FIG. 5, the lower layer group 30 may include a support layer 31 disposed below the display layer 10 (the display driving layer 12) for supporting the display layer 10 and the upper layer group 20. In some embodiments, the material of the support layer 31 may include, but is not limited to, Polyimide (PI) material, Polyethylene Terephthalate (PET) material, Polybenzimidazole (PBI) material, Polyetheretherketone (PEEK) material, Polyvinylidene fluoride (PVDF) material, Polyphenylenesulphide (PPS) material, and any combination of the above materials. In some embodiments, the support layer 31 may be made of a glass material with bending properties, and it is only necessary to ensure that the thickness of the glass meets the bending requirements. In some embodiments, in several composite materials of the support layer 31, the mass ratio of polyimide is 50%-100%; in some embodiments, in several composite materials of the support layer 31, the mass ratio of polyimide is 60%-90%. In some embodiments, the mass ratio of PET is 0-20%; in some embodiments, the mass ratio of PET is 0-10%; in some embodiments, the mass ratio of PET is 0-4%. In some embodiments, the mass ratio of PBI is 0-30%; in some embodiments, the mass ratio of PBI is 5-20%; in some embodiments, the mass ratio of PEEK is 0-4%. In some embodiments, the mass ratio of PVDF is 0-10%; in some embodiments, the mass ratio of PVDF is 0-5%. In some embodiments, the mass ratio of PPS is 0-10%; in some embodiments, the mass ratio of PPS is 0-5%.

In some embodiments, in order to avoid impurities (for example, some conductive impurities) in the support layer 31 of the lower layer group 30 from affecting the performance of the display driving layer 12 (for example, the TFT device) in the display layer 10, the lower layer group 30 may further include an isolation layer (not shown in the figure) disposed between the support layer 31 and the display driving layer 12 for isolating the support layer 31 from the display driving layer 12. In some embodiments, the material of the isolation layer may be an insulating material. In some embodiments, the material of the isolation layer may be silicon oxide film, polypropylene film, polyester film, polystyrene film, and so on. In some embodiments, a surface of the support layer 31 in contact with the display driving layer 12 may be coated with insulating paints, insulating adhesives, or the like to replace the isolation layer.

In some embodiments, when the flexible display panel 100 is in an unfolded state, the bending portion 120 and the non-bending portion 110 of the flexible display panel 100 perform image display in combination, however, due to the lower stiffness of the bending portion 120, the bending portion 120 may deform when performing the image display due to the action of stress (for example, gravity of the bending portion itself), resulting in that the surface for displaying images is relatively uneven or the display surface of the non-bending portion 110 bends, which affects the display effect of the flexible display panel 100. Therefore, the lower layer group 30 can further provide a certain rigid support when the flexible display panel 100 is unfolded, so as to keep the surface of the flexible display panel 100 flat. As shown in FIG. 5, the lower layer group may further include a reinforcement support layer 32. The reinforcement support layer 32 may be disposed below the support layer 31, and has sufficient rigidity to support the display layer 10 and the upper layer group 20, thereby improving the rigidity of the flexible display panel 100. In some embodiments, the material of the reinforcement support layer 32 may include a rigid material. In some embodiments, the rigid material used for the reinforcement support layer 32 may be a material with a relatively high Young's modulus. In some embodiments, the rigid material used for the reinforcement support layer 32 may have a Young's modulus ranging from 40 Gpa to 100 Gpa. In some embodiments, the rigid material used for the reinforcement support layer 32 may have a Young's modulus ranging from 50 Gpa to 100 Gpa. In some embodiments, the rigid material used for the reinforcement support layer 32 may have a Young's modulus ranging from 40 Gpa to 70 Gpa. In some embodiments, the material of the reinforcement support layer 32 may include, but is not limited to, steel, titanium alloy, aluminum alloy, glass, carbon fiber, glass fiber and other materials with certain rigidity. In some embodiments, the reinforcement support layer 32 may be provided with a certain number of pattern holes, and the pattern holes may be used to adjust the rigidity of the reinforcement support layer 32. If the rigid material selected for the reinforcement support layer 32 has a too high rigidity, resulting in that the reinforcement support layer 32 cannot be bent when the flexible display panel 100 is bent, in this case, a certain number of pattern holes can be provided on the reinforcement support layer 32, and the more the pattern holes there are, the lower the rigidity of the reinforcement support layer 32 is. In some embodiments, the shapes of the pattern holes may include, but are not limited to, regular or irregular shapes such as circles, triangles, diamonds, squares, and so on. In some embodiments, the reinforcement support layer 32 may be replaced by a reinforcement rib, which is implemented to provide a certain rigid support for the flexible display panel 100 when it is unfolded.

In some embodiments, as shown in FIG. 5, the lower layer group 30 may further include a buffer layer 33. In some embodiments, the buffer layer may be configured to buffer when the flexible display panel 100 is impacted. In some embodiments, the buffer layer 33 may be disposed below the support layer 31, and between the support layer 31 and the reinforcement support layer 32. In some embodiments, the material of the buffer layer 33 may include, but is not limited to, foam material, such as Polyurethane (PU) foam, silicon foam, and acrylic foam.

In some embodiments, the lower layer group 30 may include at least one layer. In some embodiments, the lower layer group 30 may include merely a support layer 31. In some embodiments, the lower layer group 30 may include a support layer 31 and a reinforcement support layer 32. In some embodiments, the lower layer group 30 may include all of a support layer 31, a buffer layer 33 and a reinforcement support layer 32. In some embodiments, in order to securely connect the respective layers in the lower layer group 30, the lower layer group 30 may further include an adhesive layer 34 disposed between adjacent two layers, through which the support layer 31 and the buffer layer 33, the buffer layer 33 and the reinforcement support layer 32 can be reliably bonded together. In some embodiments, the adhesive layer 34 may be an optical adhesive with strong adhesiveness. In some embodiments, the adhesive layer 34 may be Optically Clear Adhesive (OCA). In some embodiments, the adhesive layer 34 may be an Ultraviolet Rays adhesive (UV adhesive). In some embodiments, the adhesive layer 34 in the lower layer group 30 may be made of the same material as the adhesive layer 24 in the upper layer group 20. In some embodiments, the adhesive layer 34 in the lower layer group 30 may be made of different materials from the adhesive layer 24 in the upper layer group 20, to satisfy the bonding strength requirements between the various layers in the upper layer group 20 and that in the lower layer group 30.

In some embodiments, the flexible display panel 100 can be folded or unfolded through a winding movement or a sliding movement. In some embodiments, the bending portion 120 of the flexible display panel 100 can be connected to the rotating shaft 200, and when the flexible display panel 100 does not need to display, the rotating shaft 200 can drive the bending portion 120 to perform a winding movement around the rotating shaft 200, so that part or all of the bending portion 120 are gradually wound on the rotating shaft 200; at this time, the part or all of the bending portion 120 is stored on the rotating shaft 200, does not perform the image display and will not be observed by the user, and the display region 101 on the bending portion that will not be observed by the user, may not display images; when the flexible display panel 100 needs to be unfolded, the rotating shaft 200 can rotate to unfold part or all of the bending portion 120 around the rotating shaft 200, part or all of the bending portion 120 is presented in the user's field of vision, and the display region 101 on the bending portion 120 presented in the user's field of view may serve as an extended display region and present images to the user in combination with the display region (a main display region) on the non-bending portion 110. In some embodiments, the bending portion 120 of the flexible display panel can be connected with a movement mechanism of a terminal device, and the movement mechanism can drive the bending portion 120 to perform a sliding movement; when the flexible display panel 100 is unfolded, part or all of the bending portion 120 can exit from the back of the non-bending portion 110 (that is, the storage region) through the rotating shaft 200 by means of the sliding movement in the first direction, and move to the front of the flexible display panel 100 to be presented in the user's field of vision, and at this time, part or all of the display region on the bending portion 12 can serve as an extended display region and present images to the user in combination with the display region on the non-bending portion 110; and when the flexible display panel 100 is folded, part or all of the bending portion 120 can enter the back of the non-bending portion 110 (that is, the storage region) through the rotating shaft 200 by the sliding movement in the first direction, the bending portion 120 located in the storage region will not be presented in the user's field of vision, and the display region on the bending portion 120 located in the storage region may not display images. In some embodiments, at least a part of the bending portion 120 of the flexible display panel 100 needs to connect with the rotating shaft 200 or the movement mechanism to realize the winding movement or sliding movement of the flexible display panel 100.

Figure 6:
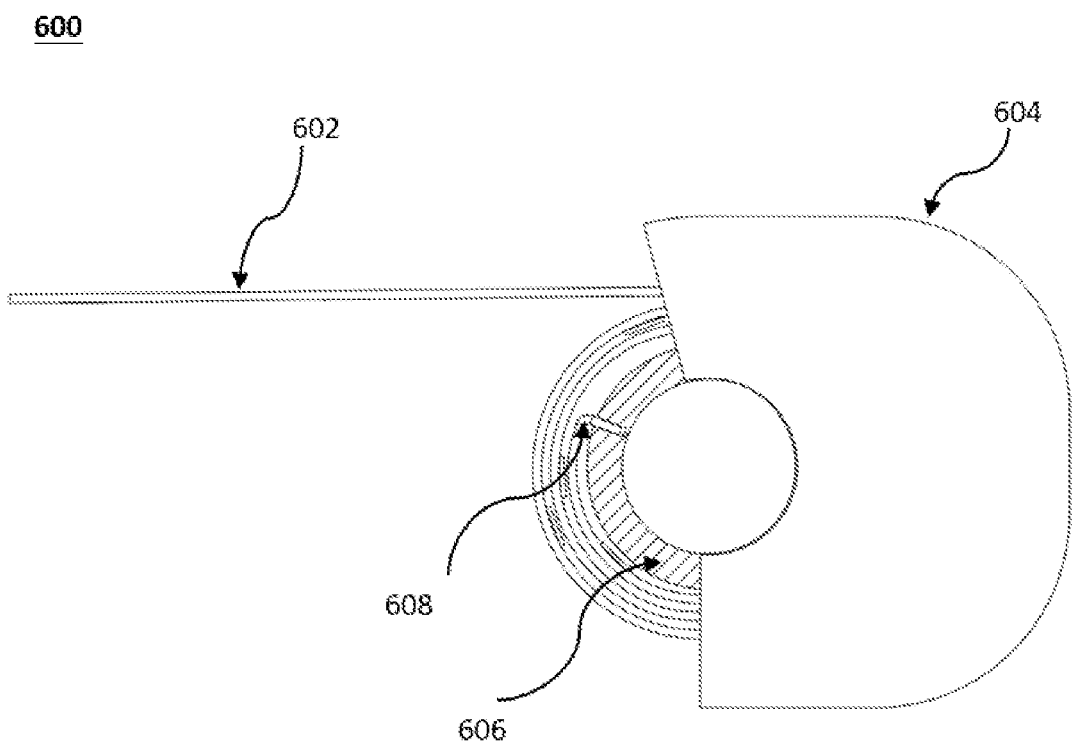
FIG. 6 is a schematic structural diagram of a flexible display apparatus according to some embodiments of the present application.

FIG. 6 is a schematic structural diagram of a flexible display apparatus according to some embodiments of the present application. As shown in FIG. 6, the flexible display apparatus 600 includes a flexible display panel 602 that can be wound, a storage device 604 and a rotating shaft 606, and the flexible display panel 602 can be wound around the rotating shaft 606 to form a winding package. The flexible display panel 602 is the same as or similar to the flexible display panel 100. For more description of the flexible display panel 602, reference may be made to the detailed description of the flexible display panel 100 in FIGS. 2-5.

In some embodiments, the rotating shaft 606 is connected to one end 608 of the flexible display panel 602, and is configured to wind the flexible display panel 602 to form a winding package when no display is required. In some embodiments, the flexible display panel 602 can be unfolded around the rotating shaft 606 when the display is required. In some embodiments, the rotating shaft 606 and the one end 608 of the flexible display panel 602 may be connected by means of a fixed connection or a detachable connection. In some embodiments, the manner of fixed connection may include, but is not limited to, an integral forming, an adhesive connection, a pin connection, and so on. In some embodiments, the manner of detachable connection may include, but is not limited to, a snap connection, a plug connection, and so on. In some embodiments, the storage device 604 may be used to receive the wound flexible display panel 602. In some embodiments, the rotating shaft 606 may be disposed inside the storage device 604 and connected to the one end 608 of the flexible display panel 602. In some embodiments, when the flexible display panel 602 needs to be wound, the rotating shaft 606 can drive the one end 608 of the flexible display panel 602 to start winding, so that the flexible display panel 602 is gradually wound on the rotating shaft 606.

Since the flexible display panel is formed as a multi-layer structure, and materials in the layers have a feature of flexibility so that the flexible display panel can be bent or wound. When the flexible display panel is bent or wound around the rotating shaft, a stress will be generated in each layer, which prevents the layer from being bent or wound, and the layer material tends to be softened and deformed under an action of the long-term stress, resulting in that the layer cannot return to flat after repeated bending, thereby generating irreversible deformation and eventually leading to a fracture failure of the flexible display panel. Therefore, the embodiments of the present application reduce stiffness or elastic modulus of the layer when the flexible display panel is bent to reduce the stress in the bending region, thereby reducing the softening and deformation probability of the layer, and improving the ability of the layer to return to flat after being bent or wound. For example, at least one layer of the upper layer group and the lower layer group of the flexible display panel 602 may include a functional material, the stiffness and elastic modulus of which may be reduced under an action of external force; and under the condition of no force or small force, the stiffness and elastic modulus may become greater than that under the action of external force.

Figure 7:
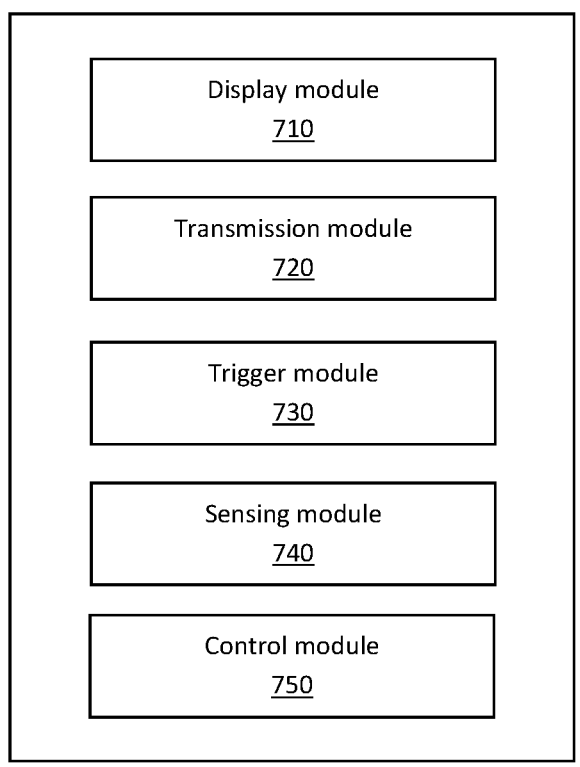
FIG. 7 is a block diagram of a flexible display apparatus according to some embodiments of the present application.

FIG. 7 is a block diagram of a flexible display apparatus 700 according to some embodiments of the present application. As shown in FIG. 7, the flexible display apparatus 700 may include a display module 710, a transmission module 720, a trigger module 730, a sensing module 740 and a control module 750. The control module 750 may be connected and communicated with the display module 710, the transmission module 720, the trigger module 730 and the sensing module 740. In some embodiments, the flexible display apparatus 700 may include a communication module (not shown in the figure). The communication module may achieve data transmission between the control module 750 and the display module 710, the transmission module 720, the trigger module 730 and the sensing module 740.

The display module 710 includes a terminal for displaying information, including a flexible display panel. As mentioned above, the flexible display panel may be formed as a multi-layer structure. For example, the flexible display panel may include a display layer, an upper layer group located above the display layer, and a lower layer group located below the display layer. In some embodiments, the upper layer group may include a cover plate layer, a touch layer, an adhesive layer, an optical layer, and so on, or a combination thereof. In some embodiments, the lower layer group may include a support layer (for example, a flexible substrate or base plate), an adhesive layer, a buffer layer, and so on, or a combination thereof. For more descriptions on the display layer, the upper layer group, and the lower layer group, reference may be made to further descriptions of FIGS. 2-5.

In some embodiments, the flexible display panel may bend during a sliding process to extend or reduce the display region. As shown in FIG. 1, the flexible display panel can be pulled out from the storage region (for example, the back of the display region) in the first direction through the rotating shaft to extend the display region, or can be slid to the storage region (for example, the back of the display region) to reduce the display region. In some embodiments, the flexible display panel may be wound. As shown in FIG. 6, when the flexible display panel does not need to perform display, it can be wound around the rotating shaft; and when the flexible display panel needs to perform display, it can be slid around the rotating shaft to be unfolded.

The transmission module 720 may be configured to drive the display module 710 to slide and/or bend (for example, be wound). In some embodiments, the transmission module 720 may include a rotating shaft and a driving device. The driving device may be configured to drive the display module 710 to slide and/or bend (for example, be wound). For example, the driving device may drive the rotating shaft to rotate so as to drive the display module 710 to be wound around the rotating shaft. For another example, the driving device may apply a pulling force to the flexible display panel, so that the display module 710 slides, and the display module 710 that has slid to the rotating shaft may bend under a force (for example, a pressure) from the rotating shaft. In some embodiments, the driving device may include, but is not limited to, a spring drive mechanism, a motor drive mechanism, a ratchet drive mechanism, a gear drive mechanism, and so on. In some embodiments, the driving device may further include a user control module, the user control module may collect the user's control instructions and transmit the control instructions to the driving device, and the user control module may collect the user's control instructions in a non-contact manner. In some embodiments, the user control module may be a gesture recognition module, a voice control module, or the like. Taking the voice control module as an example, the driving device collects voice control command of the user of the flexible display apparatus 700 through the voice control module, and controls the rotation of the rotating shaft according to the content of the voice control command to realize the folding or unfolding of the display module 710. In some embodiments, the driving device includes a torsion spring, when the display module 710 is unfolded, the torsion spring undergoes torsional deformation and stores elastic potential energy, and when the display module 710 needs to be wound, the torsion spring can drive the rotating shaft by releasing the elastic potential energy, to wind the display module 710 or apply a pressure to the display module 710 located on the rotating shaft so that the display module 710 bends under the pressure. As shown in FIG. 6, in some embodiments, the driving device may be disposed inside the storage device 604, so as to save the space occupied by the flexible display panel 602 and improve the overall appearance aesthetics of the flexible display panel 602.

The trigger module 730 may be configured to adjust a characteristic parameter of one or more layers in the display module 710. The trigger module 730 can provide a trigger condition, and in response to receipt of the trigger condition, the characteristic parameter of at least partial region of one or more layers in the upper layer group and the lower layer group of the display module 710 switches between a first range and a second range. A minimum value in the second range is greater than a maximum value in the first range. As described herein, the layer on which the trigger condition works may also be referred to as a target layer. At least partial region in the target layer on which the trigger condition works may refer to a region in the target layer that is bending or is about to bend.

In some embodiments, the characteristic parameter may include at least one of hardness, stiffness, and elastic modulus.

In some embodiments, the target layer may include a smart material, which may also be referred to as a functional material. The smart material can sense an external stimulus (for example, light, electricity, force, heat, electromagnetic field, and so on), and make a response and process based on the external stimulus to change a characteristic parameter of a region in the smart material that is affected by the external stimulus.

In some embodiments, the target layer may include at least one layer in the upper layer group and the lower layer group. For example, the target layer may include a cover plate layer. As another example, the target layer may include the adhesive layer in the upper layer group and/or the lower layer group.

In some embodiments, the target layer may include an additional layer (also referred to as an auxiliary layer) besides the layers in the upper layer group and the lower layer group. The auxiliary layer may be located in the upper layer group and/or the lower layer group. For example, the auxiliary layer may be located above the cover plate layer of the upper layer group. As another example, the auxiliary layer may be located below the support layer of the lower layer group.

In some embodiments, the trigger condition may be related to heat, force, light, electricity, electromagnetic field, and so on.

In some embodiments, the trigger condition may include a condition that a force applied to the at least partial region of the target layer is greater than a first threshold or less than a second threshold. The second threshold is less than or equal to the first threshold. In some embodiments, in response to a condition that the force applied to at least partial region of the target layer is greater than the first threshold, the characteristic parameter of the at least partial region of the target layer switches from the second range to the first range; and in response to a condition that the force applied to at least partial region of the target layer is less than the second threshold, the characteristic parameter of the at least partial region of the target layer switches from the first range to the second range. In some embodiments, in response to a condition that the force applied to at least partial region of the target layer is less than the second threshold, the characteristic parameter of the at least partial region of the target layer switches from the second range to the first range; and in response to a condition that the force applied to at least partial region of the target layer is greater than the first threshold, the characteristic parameter of the at least partial region of the target layer switches from the first range to the second range.

In some embodiments, the target layer may include a non-Newtonian fluid material if the trigger condition includes a condition that the force applied to at least partial region of the target layer is greater than a first threshold or less than a second threshold. In some embodiments, the non-Newtonian fluid material may include a pseudoplastic fluid or an expansive fluid. Under an action of external force, the viscosity of the expansive fluid material increases due to the increase of shear rate or stress, and thus hardness, stiffness and elastic modulus will increase. Under an action of external force, the viscosity of the pseudoplastic fluid material decreases due to the increase of shear rate or stress, and thus the hardness, stiffness and elastic modulus will decrease. The trigger module 730 may include some components of the transmission module 720 (for example, the rotating shaft or the driving device). For example, the display module 710 can receive a pulling force or a tensile force when the display module 701 slides, and when at least partial region of the target layer slides to the rotating shaft, the at least partial region of the target layer can apply a force to the rotating shaft under the action of the pulling force, and the rotating shaft applies a reaction force (that is, a pressure) to the at least partial region of the target layer at the same time; under the action of the reaction force, the at least partial region of the target layer is deformed (that is, is bent), generating stress, which increases with the increase of the reaction force; when the at least partial region of the target layer is not in contact with the rotating shaft, the reaction force disappears. When the reaction force applied to the target layer is greater than the first threshold or less than the second threshold, the trigger condition is formed. In some embodiments, the reaction force applied to the target layer can be adjusted by adjusting the magnitude of the pulling force or the tensile force.

In some embodiments, if the trigger condition includes a condition that the force applied to at least partial region of the target layer is greater than the first threshold or less than the second threshold, the trigger module 730 may include a pressurizing device. For example, the pressurizing device may be embedded in the rotating shaft. When at least partial region of the target layer slides to the rotating shaft, the pressurizing device can apply a pressure to the rotating shaft, so as to further increase the pressure applied to the target layer; when the at least partial region of the target layer continues to slide and moves away from the rotating shaft, the pressure on the target layer disappears. When the pressure applied to the target layer is greater than the first threshold or less than the second threshold, the trigger condition is formed.

In some embodiments, the trigger condition includes a condition that a temperature of at least partial region of the target layer is higher than a third threshold or lower than a fourth threshold. The fourth threshold is less than or equal to the third threshold. In some embodiments, in response to a condition that the temperature of at least partial region of the target layer is higher than the third threshold, the characteristic parameter of the at least partial region switches from the second range to the first range; in response to a condition that the temperature of at least partial region of the target layer is lower than the fourth threshold, the characteristic parameter of the at least partial region switches from the first range to the second range. In some embodiments, in response to a condition that the temperature of at least partial region of the target layer is lower than a fourth threshold, the characteristic parameter of the at least partial region switches from the second range to the first range; in response to a condition that the temperature of at least partial region is higher than the third threshold, the characteristic parameter of the at least partial region switches from the first range to the second range. In some embodiments, the third threshold is in a range from 25 to 45 degrees Celsius; the fourth threshold is lower than 25 degrees Celsius. In some embodiments, the third threshold is in a range from 30 to 40 degrees Celsius; the fourth threshold is lower than 30 degrees Celsius. In some embodiments, the third threshold is in a range from 35 to 45 degrees Celsius; the fourth threshold is lower than 35 degrees Celsius.

In some embodiments, if the trigger condition includes a condition that the temperature of at least partial region of the target layer is higher than the third threshold or lower than the fourth threshold, the target layer may include a thermoplastic polymer, and the trigger module 730 may include a temperature adjustment device. The temperature adjustment device may change the hardness, stiffness and/or elastic modulus of the target layer (for example, the adhesive layer) by changing the temperature of the target layer. For example, when the display module 710 is unfolded from a bent state or bent from an unfolded state, the temperature adjustment device may heat a region of the target layer that needs to be bent to reduce hardness, stiffness and/or elastic modulus of the region, thereby reducing the stress generated when the target layer is bent, making the target layer easier to be bent or wound around the rotating shaft. For another example, when the display module 710 needs to maintain a current shape (for example, the unfolded state), the temperature adjustment device can lower the temperature of the target layer to increase its hardness, stiffness and/or elastic modulus, thereby increasing the stress generated when the target layer is bent, and keeping the display module 710 flat.

In some embodiments, the temperature adjustment device includes a heating element for heating at least partial region of at least one target layer. In some embodiments, the flexible display panel can be bent or wound along an axis during the sliding process, the heating element is arranged in a target region on one side of the axis, and the heating element is configured for heating the at least partial region of the target layer having slid to the target region. In some embodiments, the target region includes a region with a distance of 0-3 centimeters away from the axis. In some embodiments, the target region includes a region with a distance of 0-5 centimeters away from the axis.

In some embodiments, the temperature adjustment device may further include at least one of a first heat shielding element and a second heat shielding element. The first heat shielding element is disposed on a side of the target region, and is configured for preventing heat of the target region from conducting to a part of the flexible display panel that has not slid to the target region during the sliding process of the flexible display panel. The second heat shielding element is located between the heating element and the lower layer group, and is configured for preventing the heat of the target region from conducting to a part of the flexible display panel that has slid to the target region after the flexible display panel stops sliding. In some embodiments, the heat shielding elements may include material that are poor conductors of heat, for example, ceramic materials, plastics, asbestos, glass, and the like. In some embodiments, the heat shielding element may be formed as a vacuum structure.

In some embodiments, the heating element is thermally connected with the rotating shaft for heating the rotating shaft.

In some embodiments, the rotating shaft includes an extension region, and when the heating element heats the rotating shaft, the extension region preheats at least one region of the target layer that has slid to the extension region.

In some embodiments, the flexible display apparatus 700 may include a terminal (for example, a mobile phone, a television, and so on). The display module 710 is connected with the terminal device. The terminal device includes a heat-generating element (for example, a battery), and the heat-generating element is thermally connected with at least partial region of the target layer. For example, the heat-generating element may be disposed below or above the target region so as to conduct heat generated by the heat-generating element of the terminal to the at least partial region of the target layer.

In some embodiments, the trigger condition includes a condition that an electric field where at least partial region of the target layer is located, is greater than a fifth threshold or less than a sixth threshold. The sixth threshold is less than or equal to the fifth threshold. In some embodiments, in response to a condition that the electric field where at least partial region of the target layer is located is less than the sixth threshold, the characteristic parameter of the at least partial region switches from the second range to the first range; in response to a condition that the electric field where at least partial region of the target layer is located is greater than the fifth threshold, the characteristic parameter of the at least partial region switches from the first range to the second range. In some embodiments, in response to a condition that the electric field where at least partial region of the target layer is located is greater than the fifth threshold, the characteristic parameter of the at least partial region switches from the second range to the first range; in response to a condition that the electric field where at least partial region of the target layer is located is less than the sixth threshold, the characteristic parameter of the at least partial region switches from the first range to the second range.

In some embodiments, if the trigger condition includes a condition that the electric field where at least partial region of the target layer is located is greater than the fifth threshold or less than the sixth threshold, the target layer may include an electroactive polymer (also referred to as a dielectric elastomer). The electroactive polymer may include electro-viscoelastic polymer, liquid crystal elastomer, carbon nanotube, electrorheological liquid, ionic polymer gel, and so on. The trigger module 730 may include a switching device connected to an applied electric field for applying or cutting off the applied electric field so as to change the characteristic parameter of the target layer.

In some embodiments, the target layer in the display module 710 may include an electrorheological fluid layer. Under a normal condition, the electrorheological fluid is in a form of suspension; when the applied electric field has an intensity much lower than a critical value, the electrorheological fluid is in a liquid state, and when the applied electric field has an intensity higher than the critical value, the electrorheological fluid is in a solid state. In some embodiments, when the display module 710 needs to be wound or unfolded, the applied electric field can be cut off, so that the electrorheological fluid layer converts into the liquid state and it is easier for the display module to bend and slide around the rotating shaft; when the display module 710 needs to maintain a current state (the wound state or the unfolded state), the applied electric field can be provided, so that the electrorheological liquid layer converts into the solid.

The sensing module 740 may be configured to collect data associated with the display module 710. The sensing module 740 may include a temperature sensor, a pressure sensor, a displacement sensor, and so on. In some embodiments, the temperature sensor may be used to measure a temperature of the target region. For example, the temperature sensor may measure the temperature of at least partial region of the target layer that has slid to the target region. The temperature sensor may include a thermocouple, a thermistor, and the like. The pressure sensor can measure a magnitude of a force applied to at least partial region of the target layer. The displacement sensor can measure a direction in which the display module slides. The displacement sensor may include a strain gauge, a gyroscope, a geomagnetic sensor, an acceleration sensor, and the like.

In some embodiments, the control module 750 may control the trigger module 730 to provide the trigger condition based on data collected by the sensing module 740. The control module 750 may include a processing unit. The processing unit may process the data collected from the sensing module 740 to control the trigger module 730 to provide the trigger condition.

In some embodiments, the processing unit can determine whether the display module 710 slides and the sliding direction thereof from the data acquired by the displacement sensor, and the processing unit can turn on the corresponding trigger module 730 to provide the trigger condition in response to the determination that the display module 710 slides and according to the sliding direction.

In some embodiments, the processing unit may determine whether the trigger condition in the trigger module 730 is formed from the data acquired by the pressure sensor. For example, the trigger condition may include a condition that the force applied to at least partial region of the target layer is greater than the first threshold or less than the second threshold, and when the processing unit determines that the pressure applied to at least partial region of the target layer obtained by the pressure sensor does not satisfy the trigger condition, the processing unit may control the trigger module 730 (for example, a pressurizing device) to increase or decrease the pressure applied to the at least partial region of the target layer, so as to form the trigger condition.

In some embodiments, the processing unit may determine whether the trigger condition in the trigger module 730 is formed from the data acquired by the temperature sensor. For example, the trigger condition may include a condition that the temperature of at least partial region of the target layer is higher than the third threshold or lower than the fourth threshold, and when the processing unit determines that the temperature of at least partial region of the target layer acquired by the temperature sensor does not satisfy the trigger condition, the processing unit may control the trigger module 730 (for example, the temperature adjustment device) to increase or decrease the temperature of the at least partial region of the target layer, so as to form the trigger condition.

In some embodiments, a processing unit may include one or more processors (for example, a single-chip processor or a multi-chip processor). In some embodiments, the processing unit may include a central processing unit (CPU), an application specific integrated circuit (ASIC), an application specific instruction set processor (ASIP), a graphics processing unit (GPU), a physical processing unit (PPU), a digital signal processor (DSP), a field programmable gate array (FPGA), a programmable logic device (PLD), a controller, a microcontroller unit, a reduced instruction set computer (RISC), a microprocessor, and the like, or any combination thereof.

In some embodiments, the control module 750 may include a main control unit (not shown in the figure) for controlling the display module 710 to display data and/or information. For example, the main control unit may apply electrical signals to the display module 710 and control the pixel units of the display layer in the display module 710 to emit lights, so that the display module 710 displays a picture.

In some embodiments, the control module 750 may include a storage unit (not shown in the figure) for storing data, instructions and/or any other information. In some embodiments, the storage device 250 may store data obtained from the processing unit, the main control unit, the display module 710 and/or any other components of the flexible display panel 700. For example, a storage unit may store data and/or instructions which the processing unit may execute, or which the processing unit may use to perform the exemplary methods described in the present application. As another example, the storage unit may store algorithms and/or strategies used by the processing unit to process data. For a further example, the storage unit may store data associated with the display module 710 acquired from the sensing module 740.

The above description of the flexible display apparatus 700 is intended to be illustrative, while not to limit the scope of the present application. Numerous alternatives, modifications and variations will be apparent to the person skilled in the art. The features, structures, methods, and other characteristics of the exemplary embodiments described herein may be combined in various manners to obtain additional and/or alternative exemplary embodiments. For example, the flexible display apparatus 700 may include one or more additional components. Additionally or alternatively, one or more components of the above-described flexible display apparatus 700 (for example, the transmission module 720) may be omitted. As another example, two or more components (for example, the trigger module 720, the sensing module 740, and/or the transmission module 720) of the flexible display apparatus 700 may be integrated into a single component.

Figure 8:
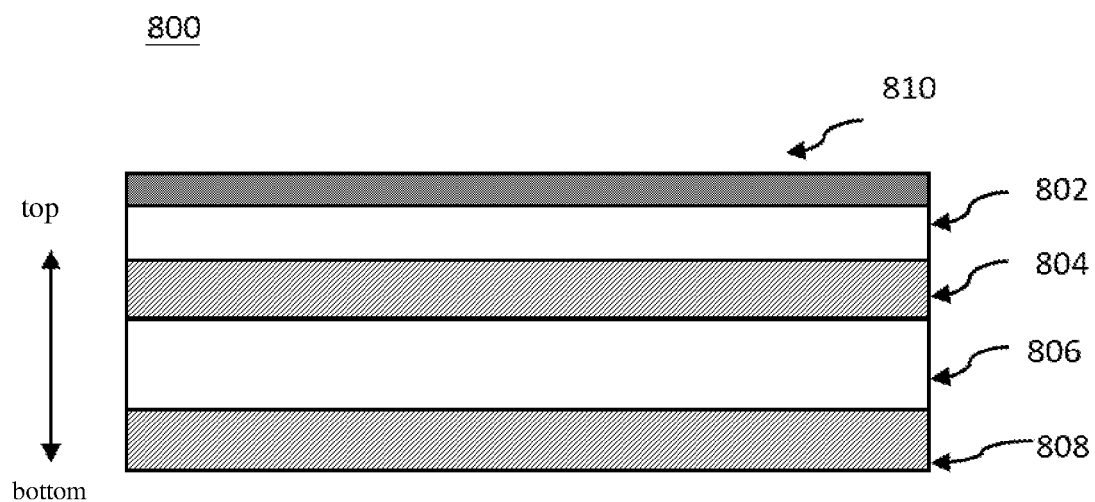
FIG. 8 is a schematic structural diagram of a flexible display panel according to some embodiments of the present application.

FIG. 8 is a schematic structural diagram of a flexible display panel according to some embodiments of the present application. The flexible display panel 800 may be an exemplary display module 810. In some embodiments, as shown in FIG. 8, the flexible display panel 800 may include a cover plate layer 802, a display device layer 804, a display driving layer 806 and a flexible substrate 808, wherein the cover plate layer 802, the display device layer 804, the display driving layer 806 and the flexible substrate 808 are arranged in order from top to bottom. In some embodiments, the various layer structures of the flexible display panel 800 may be connected by an adhesive layer. The adhesive layer may include an OCA layer, a PSA layer and/or foam for connection. For more descriptions of the cover plate layer 802, the display device layer 804, the display driving layer 806, and the flexible substrate 808, reference may be made to the descriptions elsewhere in the present application (for example, FIGS. 2-6 and their detailed descriptions).

In some embodiments, the flexible display panel 800 may further include an auxiliary layer 810. In some embodiments, the auxiliary layer 810 may be disposed on any layer of the flexible display panel 800. For example, as shown in FIG. 8, the auxiliary layer 810 may be disposed above the cover plate layer 802. For another example, the auxiliary layer 810 may be disposed between any two adjacent layers (for example, between the cover plate layer 802 and the display device layer 804). In some embodiments, the auxiliary layer 810 further may be disposed on the display device layer 804 instead of the cover plate layer 802.

In some embodiments, the auxiliary layer 810 may include a functional material that can sense an external stimulus to make a response and process. In some embodiments, the external stimulus may form a trigger condition, and in response to the trigger condition, a characteristic parameter (for example, hardness, stiffness, and/or elastic modulus) of the functional material switches between a first range and a second range, where a minimum value in the second range is greater than a maximum value in the first range.

In some embodiments, the trigger condition includes a condition that a pressure applied to the functional material is greater than a first threshold or less than a second threshold, wherein the second threshold is less than the first threshold. In response to a condition that the pressure applied to the functional material is greater than the first threshold, the characteristic parameter (for example, hardness, stiffness and/or elastic modulus) of the functional material switches from the first range to the second range; in response to a condition that the pressure applied to the functional material is less than the second threshold, the characteristic parameter (for example, hardness, stiffness and/or elastic modulus) of the functional material switches from the second range to the first range. In some embodiments, the corresponding first range of the hardness may include 4B-8B, and the second range may include H-3H. In some embodiments, the first range of the hardness may include 2B-6B and the second range may include H-9H. In some embodiments, the corresponding first range of the elastic modulus may include 1 Gpa-2 Gpa and the second range may include 3 Gpa-5 Gpa. In some embodiments, the corresponding first range of the elastic modulus may include 0 Gpa-3 Gpa and the second range may include 4 Gpa-6 Gpa.

In some embodiments, the functional material may comprise a non-Newtonian fluid material. In some embodiments, the functional material may comprise an expansive fluid material. In some embodiments, the functional material may include D30, P4U and other materials. D30 and P4U are expansive non-Newtonian fluids that remain a relaxed state under normal conditions, being soft and elastic. D30 and P4U will harden rapidly upon impact thereby forming a protective layer. After the external force disappears, D30 and P4U will return to the relaxed state. Therefore, D30 and P4U can be used to reduce impact of the external force to protect the flexible display panel. According to the embodiment of the present application, when the flexible display panel 800 is impacted or hit, the pressure applied to the auxiliary layer 810 increases instantaneously, and the hardness of the functional material in the auxiliary layer 810 can increase to protect the flexible display panel 800 from being damaged; when the applied pressure disappears or decreases, the hardness of the functional material in the auxiliary layer 810 decreases, a relaxed state can be remained, and the stress is smaller when the flexible display panel 800 is bent or wound, and thus the flexible display panel can be bent easily.

In some embodiments, the trigger condition includes a condition that a force applied to the functional material is greater than a first threshold or less than a second threshold, wherein the second threshold is less than the first threshold. In response to a condition that the force applied to the functional material is less than the second threshold, the characteristic parameter (for example, hardness, stiffness and/or elastic modulus) of the functional material switches from the first range to the second range; in response to a condition that the force applied to the functional material is greater than the first threshold, the characteristic parameter (for example, hardness, stiffness and/or elastic modulus) of the functional material switches from the second range to the first range. In some embodiments, the corresponding first range of the hardness may include 4B-8B, and the second range may include H-3H. In some embodiments, the first range of hardness may include 2B-6B and the second range may include H-9H. In some embodiments, the corresponding first range of the elastic modulus may include 1 Gpa-2 Gpa, and the second range may include 3 Gpa-5 Gpa. In some embodiments, the corresponding first range of the elastic modulus may include 0 Gpa-3 Gpa, and the second range may include 4 Gpa-6 Gpa. In some embodiments, the functional material may comprise a non-Newtonian fluid material, for example, a pseudoplastic fluid material. In some embodiments, the pseudoplastic fluid material may include polyoxyethylene film material, cellulose derivative (e.g., hydroxypropyl methylcellulose, hydroxyethyl cellulose, hydroxypropyl cellulose), polyacrylic acid, poly Vinylpyrrolidone, methyl methacrylate copolymer, carboxyvinyl copolymer, gel (e.g., gelatin gel, pectin gel, xanthan gum, tragacanth gum, guar gum, acacia gum, abrabic gum), clay (for example, bentonite, and the like), etc.

In some embodiments, the force applied to the functional material may be generated when the flexible display panel 800 is bent or wound during the sliding process. In some embodiments, the flexible display panel 800 will bend along the rotating shaft when it is subjected to an external force (for example, a tensile force or a pulling force) and perform a sliding process, under the action of the external force (the tensile force or the pulling force), the flexible display panel 800 will exert a force (for example, a pressure) on the rotating shaft, and at the same time, the rotating shaft will apply a reaction force (for example, a pressure) to the flexible display panel 800 in contact with it, and various layers in the flexible display panel 800 (for example, the auxiliary layer 810) will deform and bend under the pressure. When the pressure applied to a partial region of the auxiliary layer 810 in contact with the rotating shaft is greater than the first threshold, the hardness and elastic modulus of the partial region of the auxiliary layer 810 to which the pressure is applied will decrease, resulting in that the stress in this part of the auxiliary layer 810 decreases, and deformation may easily occur; when the pressure on this part of the auxiliary layer 810 disappears, for example, this part of the auxiliary layer 810 slides away from the rotating shaft, the hardness and elastic modulus of this part of the auxiliary layer 810 increase and return to the normal state. According to some embodiments of the present application, when the flexible display panel 800 is bent during the sliding process, the hardness and/or the elastic modulus of the auxiliary layer 810 become smaller, so as to make the flexible display panel easier to bend; when the flexible display panel 800 does not need to bend, the hardness and/or elastic modulus of the auxiliary layer 810 can increase, so that the flexible display panel can be kept flat and not easily deformed.

It should be noted that the above description is only for example and illustration, and does not limit the scope of application of the present specification. For the person skilled in the art, various modifications and changes can be made to the procedures under the guidance of the present specification. However, these modifications and changes still fall within the scope of the present specification. In some embodiments, the auxiliary layer 810 may be disposed at any position of the flexible display panel 800.

Figure 9:
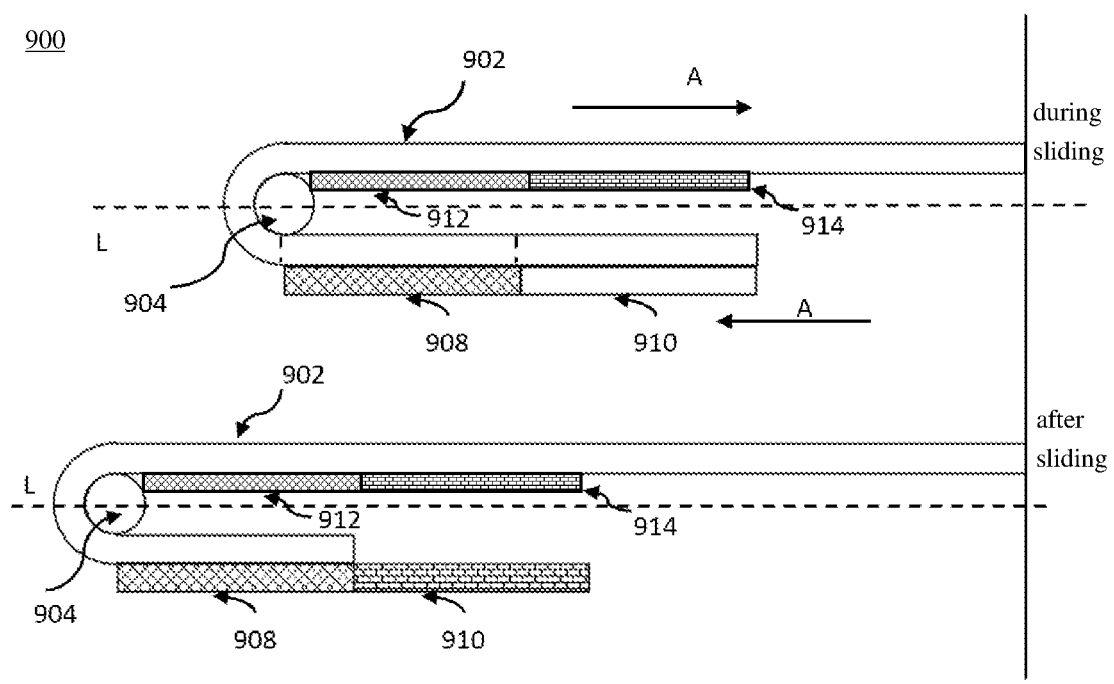
FIG. 9 is a schematic structural diagram of a sliding process of a flexible display panel according to some embodiments of the present application.

FIG. 9 is a schematic structural diagram of a sliding process of a flexible display panel according to some embodiments of the present application. As shown in FIG. 9, the flexible display apparatus 900 may include a flexible display panel 902 and a rotating shaft 904. The flexible display panel 902 can be bent along the rotating shaft 904 during the sliding process to extend and/or reduce the display region (also referred to as the main display region). In some embodiments, when the flexible display panel 902 slides in the A direction, the display region of the flexible display panel 902 can be extended; when the flexible display panel 902 slides in a direction opposite to the A direction, the display region of the flexible display panel 902 can be reduced, and part of the flexible display panel 902 can be stored at the back of the display region. As described herein, the display region refers to the region that can present information to the user; the back of the display region may refer to a non-display region. As shown in FIG. 9, the region of the flexible display panel 902 located above the dotted line L is the display region; the region of the flexible display panel 902 located below the dotted line L is the non-display region (also referred to as an extended display region).

The flexible display panel 902 is the same as or similar to the flexible display panel 100 described in FIGS. 2-5 in the present application. For example, the flexible display panel 902 may include a display layer, an upper layer group located on (or above) the display layer, and a lower layer group located below the display layer. For another example, the upper layer group may include a cover plate layer, a touch layer, an adhesive layer, an optical layer, and so on, or a combination thereof. The lower layer group may include a support layer (for example, a flexible substrates or base plate), an adhesive layer, a buffer layer, and so on, or a combination thereof. Adjacent layers may be connected by the adhesive layer (for example, an OCA layer). For example, the cover plate layer and the optical layer can be connected by the adhesive layer. For more descriptions on the display layer, the upper layer group, and the lower layer group, reference may be made to further descriptions of FIGS. 2-5.

In some embodiments, the flexible display apparatus 900 may include a driving device for driving the flexible display panel 902 to slide and/or bend. For more description of the driving device, reference may be made to the detailed descriptions of FIG. 6.

The flexible display apparatus 900 may include a temperature adjustment device. The temperature adjustment device may include a heating element 908, a heating element 912, a heat shielding element 910, and a heat shielding element 914. The heat shielding element 910 and the heat shielding element 914 may be referred to as a first heat shielding element. The heating element 908 can be installed in the non-display region within a certain distance from the rotating shaft 904. For example, the heating element 908 may be installed in the non-display region within a distance in a range from 0 cm to 3 cm from the rotating shaft 904. For another example, the heating element 908 may be installed in the non-display region within a distance in a range from 0 cm to 5 cm from the rotating shaft 904. The heating element 912 can be installed in the display region within a certain distance from the rotating shaft 904. For example, the heating element 912 may be installed in the display region within a distance in a range from 0 cm to 5 cm from the rotating shaft 904. For another example, the heating element 912 may be installed in the display region within a distance in a range from 0 cm to 5 cm from the rotating shaft 904. The region where the heating element is installed may also be referred to as the target region, and is configured to heat the layer that has slid into the target region. The heat shielding element 910 can be installed on one side of the heating element 908 or of the target region where the heating element 908 is located, and is configured to prevent heat of the target region from conducting to a part of the flexible display panel that has not slid to the target region during the sliding process of the flexible display panel 902. The heat shielding element 910 can be installed on one side of the heating element 912 or of the target region where the heating element 912 is located, and is configured to prevent heat of the target region from conducting to a part of the flexible display panel that has not slid to the target region during the sliding process of the flexible display panel 902.

The temperature adjustment device (for example, the heating element 908 or heating element 912) is configured to adjust a temperature of a part of one or more layers (that is, the target layer) in the flexible display panel 902 that has slid to the target region so as to provide a trigger condition. The trigger condition may include a condition that a temperature of a part of the target layer that has slid to the target region is higher than a third threshold or lower than a fourth threshold. The fourth threshold is less than the third threshold. In some embodiments, the third threshold is in a range from 25 to 45 degrees Celsius; the fourth threshold is lower than 25 degrees Celsius. In some embodiments, the third threshold is in a range from 30 to 40 degrees Celsius; the fourth threshold is lower than 30 degrees Celsius. In some embodiments, the third threshold is in a range from 35 to 45 degrees Celsius; the fourth threshold is lower than 35 degrees Celsius.

In some embodiments, in response to a condition that the temperature of the part of the target layer that has slid to the target region is higher than the third threshold, the characteristic parameter of the part that has slid to the target region switches from the second range to the first range; in response to a condition that the temperature of the part of the target layer that has slid to the target region is lower than the fourth threshold, the characteristic parameter of the part of the target layer that has slid to the target region switches from the first range to the second range. In some embodiments, the characteristic parameter may include elastic modulus, the first range of the elastic modulus may include 20 Kpa-40 Kpa, and the second range may include 40 Kpa-70 Kpa. In some embodiments, the first range of the elastic modulus may include 20 Kpa-50 Kpa, and the second range may include 50 Kpa-80 Kpa. In some embodiments, the first range of the elastic modulus may include 20 Kpa-40 Kpa, and the second range may include 40 Kpa-70 Kpa.

In some embodiments, the target layer may include one or more layers in the upper layer group and/or the lower layer group of the flexible display panel 902. In some embodiments, the target layer may include the adhesive layer. In some embodiments, the target layer may be the adhesive layer between the cover plate layer and the touch layer.

In some embodiments, when the flexible display panel 902 slides in the A direction to extend the display region, the sliding direction of the flexible display panel 902 can be acquired by a sensor (for example, a displacement sensor), to determine turning on of the heating element 908 in the non-display region and closing of the heat shielding element 910 on one side of the heating element 908. The heating element 908 may heat a part of the target layer in the flexible display panel 902 that has slid to the target region where the heating element 908 is located, to increase a temperature of the part of the target layer. The closing of the heat shielding element 910 prevents heat energy generated by the heating element 908 from conducting outward, especially to a part of the flexible display panel 900 that has not slid to the target region, thereby accelerating a heating rate of the part of the target layer that has slid to the target region. When the temperature of the part of the target layer that has slid to the target region is higher than the third threshold, the characteristic parameter (for example, hardness, stiffness, and/or elastic modulus) of the part of the target layer that has slid to the target region will drop to the first range, thereby reducing the hardness, stiffness and/or elastic modulus of the part of the target layer (for example, the OCA layer) that has slid to the target region, reducing the stress generated when the part of the target layer is bent, so that the part of the target layer that has slid to the target region is easily deformed (that is, bent) when passing through the rotating shaft 904. When the flexible display panel 902 stops sliding (after sliding as shown in FIG. 9), the heating element 908 stops heating, and at the same time, the heat shielding element 910 can be opened to release the heat energy in the part of the target layer located at the target region and the heating element 908, thereby accelerating the cooling rate of the target layer (for example, the OCA layer). When the temperature drops below the fourth threshold, the characteristic parameter (for example, hardness, stiffness, and/or elastic modulus) of the part of the target layer located at the target region will increase to the second range, thereby increasing the characteristic parameter (for example, hardness, stiffness and/or elastic modulus) of the target layer (for example, the OCA layer), so that the flexible display panel 902 is not easily deformed by external force and remains flat.

In some embodiments, when the flexible display panel 902 slides in a direction opposite to the A direction to reduce the display region, the sliding direction of the flexible display panel 902 may be acquired by a sensor (for example, a displacement sensor), so as to turn on the heating element 912 located at the display region and close the heat shielding element 914 on one side of the heating element 912. The heating element 912 may heat a part of the target layer in the flexible display panel 902 located at the target region where the heating element 912 is located, to increase the temperature of the part of the target layer. When the temperature of the part of the target layer that has slid to the target region is higher than the third threshold, the characteristic parameter (for example, hardness, stiffness, and/or elastic modulus) of the part of the target layer that has slid to the target region will drop to the first range, thereby reducing the hardness, stiffness and/or elastic modulus of the part of the target layer (for example, the OCA layer) that has slid to the target region, so that the part of the target layer that has slid to the target region can be easily deformed (that is, bent) when passing through the rotating shaft 904. When the flexible display panel 902 stops sliding (after sliding as shown in FIG. 9), the heating element 912 stops heating, and at the same time, the heat shielding element 914 can be opened to release the heat energy in the part of the target layer located at the target region and the heating element 912, thereby accelerating the cooling rate of the target layer (for example, the OCA layer). When the temperature drops below the fourth threshold, the characteristic parameter (for example, hardness, stiffness, and/or elastic modulus) of the part of the target layer located at the target region will increase to the second range, thereby increasing the characteristic parameter (for example, hardness, stiffness and/or elastic modulus) of the target layer (for example, the OCA layer) so that the flexible display panel 902 is not easily deformed by external force and remains flat.

It should be noted that the above description is only for example and illustration, and does not limit the scope of application of the present specification. For the person skilled in the art, various modifications and changes can be made to the procedures under the guidance of the present specification. However, these modifications and changes still fall within the scope of the present specification. For example, the heating element 912 and heat shielding element 914 disposed in the display region can be removed. The heating element 908 and the heat shielding element 910 disposed in the non-display region can be movably installed on an inner side of the flexible display panel 902 in the non-display region. When the flexible display panel 902 slides in the A direction to extend the display region, the heating element 908 and the heat shielding element 910 can move into the non-display region; and when the flexible display panel 902 slides in the direction opposite to the A direction to reduce the display region, the heating element 908 and the heat shielding element 910 can move into the display region. For example, a slide rail may be provided on one side of the rotating shaft 904, and the heating element 908 can be connected to the slide rail and can move on the slide rail. In some embodiments, a heat shielding cover may further be provided below the heating element 908 and/or the heating element 912 to further accelerate the heating rate and cooling rate of the OCA layer.

Figure 10:
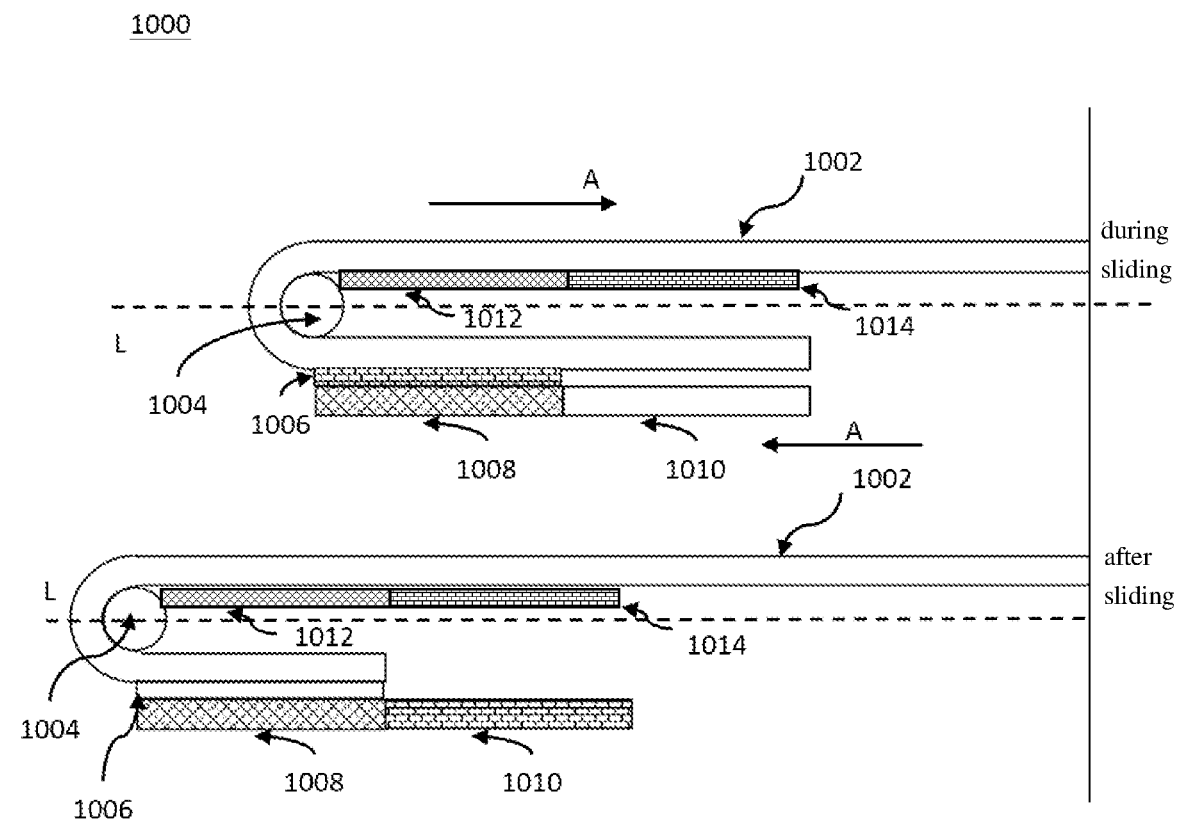
FIG. 10 is a schematic structural diagram of a sliding process of a flexible display panel according to some embodiments of the present application.

FIG. 10 is a schematic structural diagram of a sliding process of a flexible display panel according to some embodiments of the present application. The flexible display apparatus 1000 may be similar to the flexible display apparatus 900. For example, the flexible display apparatus 1000 may include a flexible display panel 1002 and a rotating shaft 1004. The flexible display panel 1002 can be bent along the rotating shaft 1004 during the sliding process to extend and/or reduce the display region. As shown in FIG. 10, when the flexible display panel 1002 slides in the A direction, the display region of the flexible display panel 1002 can be extended; when the flexible display panel 702 slides in a direction opposite to the A direction, the display region of the flexible display panel 1002 can be reduced, and a part of the flexible display panel 1002 can be stored at a back of the display region. As another example, the flexible display panel 1002 may include a display layer, an upper layer group located on (or above) the display layer, and a lower layer group located below the display layer. For another example, the upper layer group may include a cover plate layer, a touch layer, an adhesive layer, an optical layer, and so on, or a combination thereof. The lower layer group may include a support layer (for example, a flexible substrate or base plate), an adhesive layer, a buffer layer, and so on, or a combination thereof. For another example, the flexible display apparatus 1000 may include a temperature adjustment device. The temperature adjustment device may include a heating element 1008, a heating element 1012, a heat shielding element 1010, and a heat shielding element 1014. The heating element 1008 and/or the heating element 1012 may be installed within a certain distance from the rotating shaft 1004. For example, the heating element 1008 may be installed in a region with a distance of 0 cm to 3 cm from the rotating shaft 1004. As another example, the heating element 1008 may be installed in a region with a distance of 0 cm to 5 cm from the rotating shaft 1004.

In some embodiments, different from the flexible display apparatus 900, the temperature adjustment apparatus may further include a heat shielding element 1006, which may also be referred to as a second heat shielding element. The heat shielding element 1006 may be disposed between the heating element 1008 and the flexible display panel 1002 (for example, the lower layer group of flexible display panel 1002). The heat shielding element 1006 can be configured to prevent heat of the target region where the heating element 1008 is located from conducting to a part of the flexible display panel 1002 that has slid to the target region, after the flexible display panel 1002 stops sliding.

In some embodiments, when the flexible display panel 1002 slides in the A direction to extend the display region, the sliding direction of the flexible display panel 1002 and/or whether the flexible display panel 1002 slides can be acquired by a sensor (for example, a displacement sensor), so as to turn on the heating element 1008 located at the non-display region, close the heat shielding element 1010 on one side of the heating element 1008, and open the heat shielding element 1006. The heating element 1008 can heat a part of the target layer of the flexible display panel 1002 that has slid to or is located at the target region where the heating element 1008 is located, to increase a temperature of this part of the target layer. When the temperature of the part of the target layer is higher than the third threshold, the characteristic parameter (for example, hardness, stiffness and/or elastic modulus) of the part of the target layer that has slid into the target region will drop to the first range, so that the hardness, stiffness, and/or elastic modulus of the part of the target layer (for example, the OCA layer) decreases and the part of the target layer in the target region is easily deformed (that is, bent) when passing through the rotating shaft 1004. At the same time, the opening heat shielding element 1006 facilitates the conduction of heat energy generated by the heating element 1008 to the target layer; and the closed heat shielding element 1010 can prevent the heat energy generated by the heating element 1008 from conducting outward, especially to a part of the flexible display panel 1002 that has not slid to the target region, thereby increasing the heating rate of the target layer located at the target region. When the flexible display panel 1002 stops sliding (after sliding as shown in FIG. 10), the heating element 1008 is turned off to stop heating, the heat shielding element 1006 is closed to prevent the heat in the target region where the heating element 1008 is located from conducting to a part of the flexible display panel 1002 that has slid to target region, and at the same time, the heat shielding element 1010 is opened to release the heat energy of the part of the target layer located at the target region and the heating element 1008, thereby accelerating the cooling rate of the target layer (for example, the OCA layer). When the temperature drops below the fourth threshold, the characteristic parameter (for example, hardness, stiffness, and/or elastic modulus) of the part of the target layer located at the target region will increase to the second range, thereby increasing the characteristic parameter (for example, hardness, stiffness, and/or elastic modulus) of the part of the target layer (for example, the OCA layer), so that the flexible display panel 1002 is not easily deformed by external force and remains flat.

In some embodiments, another heat shielding element (not shown in the figure) may be provided between the heating element 1012 and the flexible display panel 1002. In some embodiments, when the flexible display panel 1002 slides in the direction opposite the A direction to reduce the display region, the sliding direction of the flexible display panel 1002 can be acquired by a sensor (for example, a displacement sensor), the heating element 1012 located at the display region and the heat shielding element between the heating element 1012 and the flexible display panel 1002 can be turned on so that the heat energy generated by the heating element 1012 can be conducted to the target layer, and at the same time, the heat shielding element 1014 on one side of the heating element 1012 is closed to prevent the heat energy generated by the heating element 1012 from conducting outward, especially to a part of the flexible display panel 1002 that has not slid to the target region, thereby accelerating the heating rate of the target layer. The heating element 1012 can heat the part of the target layer in the flexible display panel 1002 in the target region where the heating element 1012 is located, to increase the temperature of the part of the target layer. When the temperature of the part of the target layer is higher than the third threshold, the characteristic parameter (for example, hardness, stiffness and/or elastic modulus) of the part of the target layer located at the target region will drop to the first range, thereby decreasing the characteristic parameter (for example, hardness, stiffness, and/or elastic modulus) of the part of the target layer (for example, the OCA layer), and reducing the stress in this part of the target layer, so that this part of the target layer in the target region can be easily deformed (that is, bent) when passing through the rotating shaft 1004. When the flexible display panel 1002 stops sliding, the heating element 1012 and the heat shielding element 1006 between the heating element 1012 and the flexible display panel 1002 are turned off to prevent the heat of the target region where the heating element 1012 is located from conducting to a part of the flexible display panel 1002 that has slid to the target region, and at the same time, the heat shielding element 1014 can be opened to release the heat energy in the part of the target layer located at the target region and the heating element 1012, thereby accelerating the cooling rate of the target layer (for example, the OCA layer). When the temperature drops below the fourth threshold, the characteristic parameter (for example, hardness, stiffness, and/or elastic modulus) of the part of the target layer located at the target region will increase to the second range, thereby increasing the characteristic parameter (for example, hardness, stiffness, and/or elastic modulus) of the part of the target layer (for example, the OCA layer), so that the flexible display panel 1002 is not easily deformed by external force and remains flat.

It should be noted that the above description is only for example and illustration, and does not limit the scope of application of the present specification. For the person skilled in the art, various modifications and changes can be made to the procedures under the guidance of the present specification. However, these modifications and changes still fall within the scope of the present specification. For example, the heating element 1012 and the heat shielding element 1014 provided in the display region may be removed. The heating element 1008 and the heat shielding element 1010 provided in the non-display region may be movably installed on an inner side of the flexible display panel 1002 in the non-display region. When the flexible display panel 1002 slides in the A direction to extend the display region, the heating element 1008 and the heat shielding element 1010 can move into the non-display region; and when the flexible display panel 1002 slides in the direction opposite to the A direction to reduce the display region, the heating element 1008 and the heat shielding element 1010 can be moved into the display region. For example, a slide rail may be provided on one side of the rotating shaft 1004, and the heating element 1008 may be connected to and moved on the slide rail. In some embodiments, a heat shield cover may further be provided below the heating element 1008 and/or the heating element 1012, so as to further accelerate the heating rate and cooling rate of the target layer (for example, the OCA layer).

Figure 11:
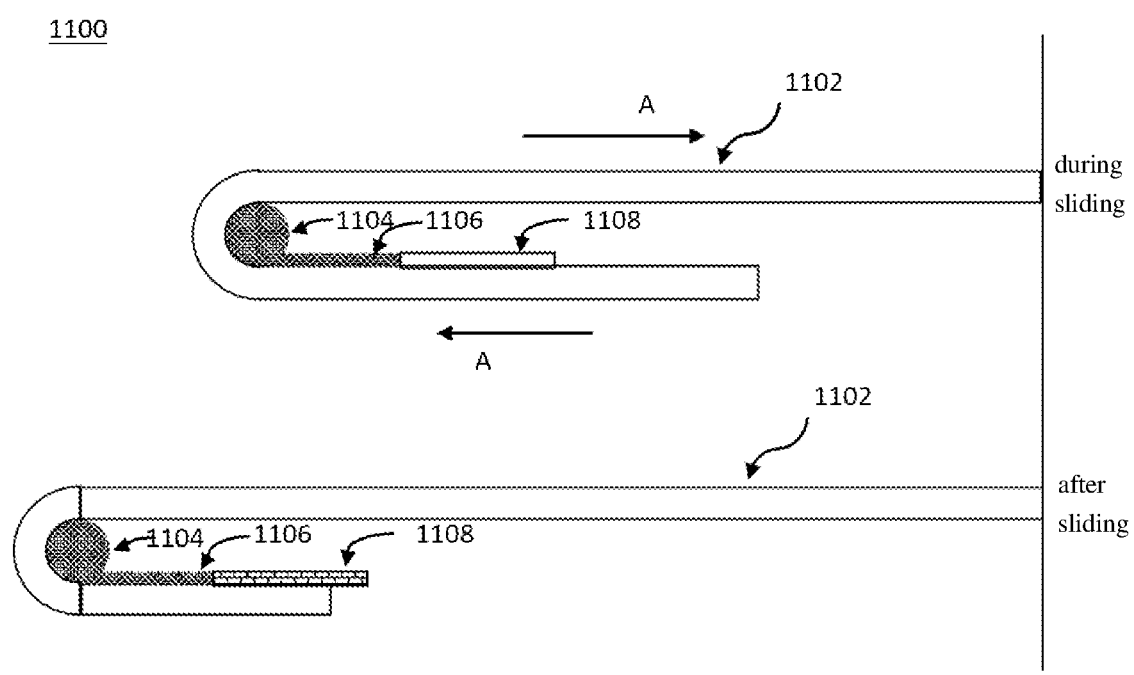
FIG. 11 is a schematic structural diagram of a sliding process of a flexible display panel according to some embodiments of the present application.

FIG. 11 is a schematic structural diagram of a sliding process of a flexible display panel according to some embodiments of the present application. The flexible display apparatus 1100 may be similar to the flexible display apparatus 900. For example, the flexible display apparatus 1100 may include a flexible display panel 1102 and a rotating shaft 1104. The flexible display panel 1102 can be bent along the rotating shaft 1104 during a sliding process to extend and/or reduce the display region. As shown in FIG. 11, when the flexible display panel 1102 slides in the A direction, the display region of the flexible display panel 1102 can be extended; when the flexible display panel 1102 slides in a direction opposite to the A direction, the display region of the flexible display panel 1102 can be reduced, and a part of the flexible display panel 1102 can be stored at a back of the display region. As another example, the flexible display panel 1102 may include a display layer, an upper layer group located on (or above) the display layer, and a lower layer group located below the display layer. For another example, the upper layer group may include a cover plate layer, a touch layer, an adhesive layer, an optical layer, and so on, or a combination thereof. The lower layer group may include a support layer (for example, a flexible substrate or base plate), an adhesive layer, a buffer layer, and so on, or a combination thereof. For another example, the flexible display apparatus 1100 may include a temperature adjustment device. The temperature adjustment device may include a heating element (not shown in the figure) and a heat shielding element 1108.

In some embodiments, different from the flexible display apparatus 900, a heating element may be installed in the rotating shaft 1104 and in thermal connection with the rotating shaft 1104 so as to heat the rotating shaft 1104. In some embodiments, the rotating shaft 1104 may include an extension region 1106. When the heating element heats the rotating shaft 1104, the extension region 1106 is configured to preheat a partial region of the target layer that has slid to the extension region 1106. In some embodiments, the extension region 1106 may have a length in the sliding direction in a range of 0 cm-3 cm. In some embodiments, the extension region 1106 may have a length in the sliding direction in a range of 0 cm-5 cm. The heat shielding element 1108 may be located on one side of the extension region 1106.

In some embodiments, when the flexible display panel 1102 slides in the A direction to extend the display region, whether the flexible display panel 1102 slides and/or the sliding direction can be acquired by a sensor (for example, a displacement sensor), so as to turn on the heating element and close the heat shielding element 1108 on one side of the heating element. The heating element can heat the rotating shaft 1104 and the extension region 1106 thereof. The heated extension region 1106 may conduct heat to a part of the target layer that has slid to the extension region 1106 to preheat the part of the target layer. After preheated, the temperature of the part of the target layer increases, and after sliding to the rotating shaft 1104, when the temperature of the part of the target layer is higher than the third threshold, the characteristic parameter (for example, hardness, stiffness and and/or elastic modulus) of the part of the target layer will drop to the first range, thereby reducing the characteristic parameter (for example, hardness, stiffness, and/or elastic modulus) of the part of the target layer (for example, the OCA layer) so that the part of the target layer (for example, the OCA layer) is easily be deformed (that is, bent) when passing through the rotating shaft 1104. At the same time, the closed heat shielding element 1010 can prevent the heat energy of the extension region 1106 from conducting outward, especially to a part of the flexible display panel 1102 that has not slid to the extension region 1106, thereby accelerating the heating rate of the part of the target layer that has slid to the extension region 1106. When the flexible display panel 1102 stops sliding (after sliding as shown in FIG. 11), the heating element is turned off to stop heating, and at the same time, the heat shielding element 1108 can be opened to release the heat energy of the extension region 1106 and the rotating shaft 1104, thereby accelerating the cooling rate of the target layer (for example, the OCA layer). When the temperature drops below the fourth threshold, the characteristic parameter (for example, hardness, stiffness, and/or elastic modulus) of the part of the target layer that has slid to the extension region 1106 and the rotating shaft 1104 will increase to the second range, thereby increasing the characteristic parameter (for example, hardness, stiffness, and/or elastic modulus) of the part of the target layer (for example, the OCA layer), so that the flexible display panel 1102 is not easily deformed by external force and remains flat.

In some embodiments, the extension region 1106 is movably connected to the rotating shaft 1104. In some embodiments, when the flexible display panel 1102 slides in a direction opposite to the A direction to reduce the display region, the extension region 1106 and/or the heat shielding element 1108 may move to the display region (that is, an upper side of the rotating shaft 1104); when the flexible display panel 1102 slides in the A direction to extend the display region, the extension region 1106 and/or the heat shielding element 1108 may move to the non-display region (that is, a lower side of the rotating shaft 1104). In some embodiments, a slide rail may be provided opposite to a surface of the rotating shaft 1104 in contact with the flexible display panel 1102, and the extension region 1106 may be connected with the slide rail to slide between the display region and the non-display region through the slide rail.

In some embodiments, when the flexible display panel 1102 slides in a direction opposite to the A direction to reduce the display region, the sliding direction of the flexible display panel 1102 can be acquired by a sensor (for example, a displacement sensor), so as to control the extension region 1106 and/or the heat shielding element 1108 to move to the display region (that is, the upper side of the rotating shaft 1104); when the flexible display panel 1102 slides in the A direction to extend the display region, the sliding direction of the flexible display panel 1102 can be acquired by a sensor (for example, a displacement sensor), so as to control the extension region 1106 and/or the heat shielding element 1108 to move to the non-display region (that is, the lower side of the rotating shaft 1104).

It should be noted that the above description is only for example and illustration, and does not limit the scope of application of the present specification. For the person skilled in the art, various modifications and changes can be made to the procedures under the guidance of the present specification. However, these modifications and changes still fall within the scope of the present specification. In some embodiments, a heat shield cover may further be provided above or below the extension region 1106 to further accelerate the heating rate and cooling rate of the target layer.

Figure 12:
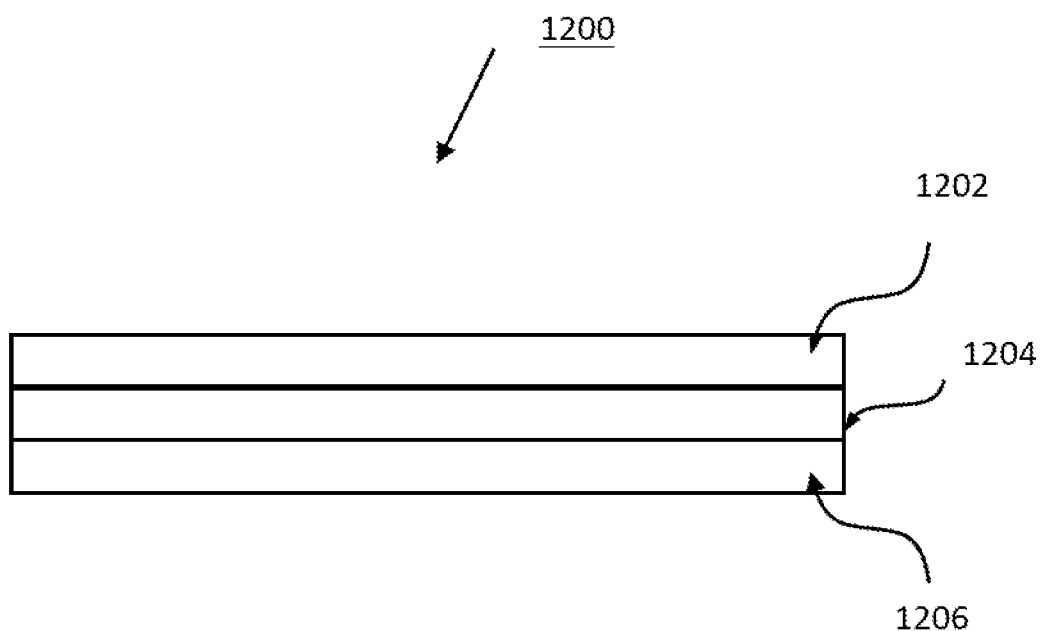
FIG. 12 is a schematic structural diagram of a heating element according to some embodiments of the present application.

FIG. 12 is a schematic structural diagram of an exemplary heating element illustrated according to some embodiments of the present application. As shown in FIG. 12, the heating element 1200 may include an insulating layer 1202, a heat generating layer 1204, an insulating layer 1206, and an electrode (not shown). The insulating layer 1202, the heat generating layer 1204 and the insulating layer 1206 may be stacked in order from top to bottom. The heat generating layer 1204 may be electrically connected to the electrode.

The heat generating layer 1204 may be configured to generate heat. In some embodiments, when heating is required, for example, when the flexible display panel slides and bends, the electrode connected to the heat generating layer 1204 can be communicated with a power supply device to provide power to the heat generating layer 1204, and the heat generating layer 1204 can convert the electric energy to heat energy. In some embodiments, the heat generating layer 1204 may include a resistive circuit. In some embodiments, the heat generating layer 1204 may include a conductive alloy (for example, stainless steel, aluminum, brass, copper-nickel alloy, and copper), a resistive heating film (for example, an indium tin oxide (ITO) film), and so on.

The insulating layers 1202 and 1204 may be configured to protect the heat generating layer 1204. In some embodiments, the insulating layers 1202 and 1204 may include insulating materials, for example, PET, polyimide layers, and so on.

The beneficial effects that one or more embodiments disclosed in the present application may bring include but are not limited to: (1) the flexible display panel of the present application has lower hardness, stiffness or elastic modulus when it needs to be wound or unfolded, thereby reducing deformation stress and facilitating bending operations; and (2) the flexible display panel of the present application has higher hardness, stiffness or elastic modulus when it needs to maintain the current state, which can provide better support after the screen assembly is wound or unfolded, and is not easy to be deformed or damaged by external force.

The above description merely relates to the preferred embodiments of the present application, and is not intended to limit the present application, and any modification, equivalent replacement, improvement and the like made within the spirit and principle of the present application, should be included in the protection scope of the present application.

What is claimed is:

1. A flexible display panel comprising:
a display layer;
an upper layer group located above the display layer, wherein the upper layer group comprises at least one layer; and
a lower layer group located below the display layer, wherein the lower layer group comprises at least one layer, the at least one layer of at least one of the upper layer group and the at least one layer of the lower layer group comprises at least one target layer; and
in response to a trigger condition, a characteristic parameter of at least partial region of the at least one target layer in at least one of the upper layer group and the lower layer group switches between a first range and a second range, and a minimum value in the second range is greater than a maximum value in the first range, wherein the trigger condition comprises a condition that a temperature of the at least partial region is higher than a third threshold or lower than a fourth threshold, wherein the fourth threshold is less than the third threshold;
a temperature adjustment device, wherein the trigger condition is provided by the temperature adjustment device; the temperature adjustment device further comprises a heating element configured to heat the at least partial region of the at least one target layer; the flexible display panel is configured to bend along an axis during a sliding process, the heating element is disposed in a target region on a first side of the axis, and the heating element is configured for heating the at least partial region of the at least one target layer that has reached the target region; the flexible display panel includes a non-bending portion and a bending portion, part or all of the bending portion is bent around the axis; the heating element is arranged corresponding to the non-bending portion.

2. The flexible display panel of claim 1, wherein the characteristic parameter comprises at least one of hardness, stiffness, and an elastic modulus of the at least partial region.

3. The flexible display panel of claim 1, wherein
in response to a condition that the temperature of the at least partial region is higher than the third threshold, the characteristic parameter switches from the second range to the first range; and
in response to a condition that the temperature of the at least partial region is lower than the fourth threshold, the characteristic parameter switches from the first range to the second range.

4. The flexible display panel of claim 1, wherein the third threshold is in a range from 30 degrees Celsius to 40 degrees Celsius; and the fourth threshold is lower than 30 degrees Celsius.

5. The flexible display panel of claim 1, further comprising:
a sensor configured to detect whether the flexible display panel slides; and
a controller configured to:
in response to the sensor detecting sliding of the flexible display panel, turn on the heating element; and
in response to the sensor detecting the flexible display panel is no longer sliding, turn off the heating element.

6. The flexible display panel of claim 5, wherein the temperature adjustment device further comprises:
a first heat shielding element disposed on a first side of a target region and configured to prevent heat of the target region from conducting to a part of the flexible display panel that has not reached the target region during the sliding process of the flexible display panel; and
a second heat shielding element located between the heating element and the lower layer group, and configured to prevent the heat of the target region from conducting to a part of the flexible display panel that has reached the target region when the flexible display panel stops sliding.

7. The flexible display panel of claim 1, wherein the flexible display panel is physically connected with a rotating shaft, the flexible display panel is configured to bend along the rotating shaft during sliding, the heating element is thermally connected with the rotating shaft, and the heating element is configured for heating the rotating shaft.

8. The flexible display panel of claim 7, wherein the rotating shaft comprises an extension region, and, when the heating element heats the rotating shaft, the extension region is configured to preheat the at least partial region of the at least one target layer after it has reached the extension region.

9. The flexible display panel of claim 1, wherein the flexible display panel is connected with a terminal device that comprises a heating element thermally connected with the at least partial region of the at least one target layer.

* * * * *